United States Patent [19]
Takai et al.

[11] Patent Number: 6,124,388
[45] Date of Patent: *Sep. 26, 2000

[54] WATER REPELLENT COMPOSITION, FLUOROCARBON POLYMER COATING COMPOSITION AND COATING FILM THEREFROM

[75] Inventors: Kenichi Takai, Musashino; Hiroyuki Saito, Kokubunji; Goro Yamauchi, Hachioji; Hisayoshi Takazawa, Higashimurayama; Yasutaka Imori, Chofu, all of Japan

[73] Assignee: Nippon Telegraph and Telephone Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/682,353

[22] Filed: Jul. 17, 1996

[30] Foreign Application Priority Data

Jul. 19, 1995 [JP] Japan ................................. 7-204073

[51] Int. Cl.$^7$ .................................. C08J 5/07; C08J 51/00
[52] U.S. Cl. ............................ 524/366; 524/545; 524/546
[58] Field of Search ...................................... 524/366, 545, 524/546

[56] References Cited

U.S. PATENT DOCUMENTS 3,975,352 8/1976 Yoerger et al. ..................... 260/33.8 F

FOREIGN PATENT DOCUMENTS

| | | |
|---|---|---|
| 0 132 716 A1 | 2/1985 | European Pat. Off. . |
| 0 503 872 A1 | 9/1992 | European Pat. Off. . |
| 0 690 096 A1 | 1/1996 | European Pat. Off. . |
| 3-184208 | 8/1991 | Japan . |
| 6-122841 | 5/1994 | Japan . |
| 6-248110 | 9/1994 | Japan . |
| 7-331122 | 12/1995 | Japan . |
| WO 94/21729 | 9/1994 | WIPO . |

OTHER PUBLICATIONS

Ozawa et al. "Antisnow Sticking of Transmission Line Using Ultra Water Repellent Paint" p. 126. NTT New Technical Field Enterprise Promotion Section.

Saito et al. "Water Repellent Coating Containing Fluoride Particles Dispersed in Binder" 1995, pp. 389–392.

Saito et al. "A Study on the Relationship Between Roughness and Ice Adhesion of Water Repellent Surface" vol. 47, No. 2, 1996, pp. 87–88, Technical Assistance Support Center.

Saito et al. "Snow Adhesive Property of Water Repellent Coatings" NTT Technical Assistant Support Center, 1995, p. 35.

Saito et al. "Thermodynamic Study on Ice Adhesion to Water Repellent Surface" pp. 1–2.

*Primary Examiner*—Peter D. Mulcahy
*Attorney, Agent, or Firm*—Venable; Robert J. Frank; Ashley J. Wells

[57] ABSTRACT

Fluorocarbon polymer coating composition and coating film include a fluorocarbon polymer powder, a binder and an additive comprised by a substance having a surface free energy smaller than that of the binder. The coating composition and coating film have improved resistance to deterioration with time of the water repellent properties of the film.

17 Claims, 16 Drawing Sheets

WATER REPELLENT COMPOSITION, FLUOROCARBON POLYMER COATING COMPOSITION AND COATING FILM THEREFROM

BACKGROUND OF THE INVENTION

1. Field of the Invention

The present invention relates to a composition containing fluorocarbon polymer powder, to a coating composition containing fluorocarbon polymer powder and a binder dispersing the powder, and to a coating film made therefrom. Films made from the fluorocarbon polymer composition or coating composition of the present invention have water repellent properties, water proofing properties, anti snow adhesion, lubricating properties so that the composition of the present invention can be used as coated on various articles which need to have water repellent properties. Articles that require water repellent properties include, for example, rain goods such as umbrellas, exteriors of buildings, outdoor constructions, automobiles, and the like. Articles or products which must have antisnow-sticking properties and antiice-sticking properties are, for example, roofs of houses or buildings located in heavy snow falling regions, antennae for radio communication, cables, steel towers, railway vehicles, ships, automobiles, jigs for civil engineering machines, and the like. Also, the fluorocarbon polymer composition and coating composition of the present invention can be used in a wide variety of applications including protective films for protecting metal articles.

2. Description of the Related Art

Conventional fluorocarbon polymer coating compositions and films are used in various fields including construction or architecture, automobiles, and the like. These coating compositions and coating films comprise single component system consisting of a copolymer of a fluoroolefin with one or more of various other hydrocarbons. There have been used two-component coating compositions and coating films which contain polytetrafluoroethylene or polyvinylidene fluoride as a main component mixed with a specific acrylic resin. However, these conventional coating compositions and coating films do not have sufficiently high water repellent properties and the resulting films have a water contact angle of about 80°. In previous efforts, the present inventors have investigated water repellent properties of fluorocarbon polymer-based coating compositions and coating films therefrom and realized two-component coating compositions which contain a fluorocarbon polymer powder dispersed in a binder and have high water repellent properties as expressed in terms of water contact angle of about 140°. The coating compositions and coating films have been put into practical use.

However, the two-component coating compositions and coating films made therefrom associated with a problem that instead of their excellent initial water repellent properties, the coating compositions and coating films made therefrom suffer deterioration of water repellent properties when immersed in water for a prolonged period of time.

SUMMARY OF THE INVENTION

Accordingly, an object of the present invention is to obviate the above problems associated with the conventional coating compositions and coating films and provide a fluorocarbon polymer coating composition.

Another object of the present invention is to provide a fluorocarbon polymer coating film.

Still another object of the present invention is to provide a fluorocarbon polymer composition or material.

According to a first aspect, the present invention provides a fluorocarbon polymer coating composition comprising:

a fluorocarbon polymer powder;

a binder; and an additive comprising a substance having a surface free energy smaller than that of the binder.

Here, the additive may be one substance selected from a fluoro oil, a surfactant, and mixtures thereof.

The fluoro oil may be at least one of perfluorinated polyether, perfluorinated alkyl polyether, and polytrifluoroethylene.

The surfactant may be a fluorocarbon surfactant.

The fluorocarbon polymer powder may be at least one of polytetrafluoroethylene powder, tetrafluoroethylene/hexafluoropropylene copolymer powder, polyvinylidene fluoride powder, and mixtures thereof.

The fluorocarbon polymer powder may comprise fluorocarbon polymer having partially or completely fluorinated terminal groups.

The binder may be at least one of polyvinylidene fluoride, polytetrafluoroethylene, acrylic silicone resin, polyester resin, ethylene/carbon monoxide copolymer, ethylene/vinylketone copolymer, propylene/vinylketone copolymer, styrene/vinylketone and copolymer.

The binder may be at least one of polyvinylidene fluoride, polytetrafluoroethylene, acrylic silicone and polyester resin.

The additive may preferably have a surface free energy larger than that of the perfluorinated polymer powder.

The fluorocarbon polymer powder may preferably comprise fluorocarbon polymer having an average molecular weight of 500 to 20,000.

According to a second aspect, the present invention provides a fluorocarbon polymer coating film comprising:

a fluorocarbon polymer powder;

a binder; and an additive comprising a substance having a surface free energy smaller than that of the binder.

Here, the additive may be one substance selected from a fluoro oil, a surfactant, and mixtures thereof.

The fluoro oil may be at least one of perfluorinated polyether, perfluorinated alkyl polyether, and polytrifluoroethylene.

The surfactant may be a fluorocarbon surfactant.

The fluorocarbon polymer powder may be at least one of polytetrafluoroethylene powder, tetrafluoroethylene/hexafluoropropylene copolymer powder, polyvinylidene fluoride powder, and mixtures thereof.

The fluorocarbon polymer powder may comprise fluorocarbon polymer having partially or completely fluorinated terminal groups.

The binder may be at least one of polyvinylidene fluoride, polytetrafluoroethylene, acrylic silicone resin, polyester resin, ethylene/carbon monoxide copolymer, ethylene/vinylketone copolymer, propylene/vinylketone copolymer, styrene/vinylketone and copolymer.

The binder may be at least one of polyvinylidene fluoride, polytetrafluoroethylene, acrylic silicone and polyester resin.

The additive may have a surface free energy larger than that of the perfluorinated polymer powder.

The fluorocarbon polymer powder may comprise fluorocarbon polymer having an average molecular weight of 500 to 20,000.

The fluorocarbon polymer powder may exist in agglomerate units comprised by a mixture of the fluorocarbon polymer powder with the binder or the additive, the agglomerate unit constituting the coating film.

Gaps between particles of the fluorocarbon polymer powder may be filled with at least one of the binder and the additive.

According to a third aspect, the present invention provides a water repellent composition comprising:

a fluorocarbon polymer powder comprising a fluorocarbon polymer having a molecular weight of 500 to 20,000;

a matrix resin selected from the group consisting of polyvinylidene fluoride, polytetrafluoroethylene, acrylic silicone resin, polyester resin, epoxy resin, ethylene/carbon monoxide, ethylene/vinylketone copolymer, propylene/vinylketone copolymer, styrene/vinylketone copolymer, and mixtures thereof; and an additive comprising a substance having a surface free energy smaller than that of the matrix resin.

Here, the fluorocarbon polymer powder may be at least one selected from the group consisting of polyvinylidene fluoride, polytetrafluoroethylene, acrylic silicone resin, polyester resin, epoxy resin, and mixtures thereof.

The additive may be at least one substance selected from a fluoro oil, surfactant and mixtures thereof.

The fluoro oil may be at least one of perfluorinated polyether, perfluorinated alkyl polyether, and polytrifluoroethylene.

The surfactant may be a fluorocarbon surfactant.

The fluorocarbon polymer powder may be at least one of polytetrafluoroethylene powder, tetrafluoroethylene/hexafluoropropylene copolymer powder, polyvinylidene fluoride powder, and mixtures thereof.

The fluorocarbon polymer powder may comprise fluorocarbon polymer having partially or completely fluorinated terminal groups.

The additive may have a surface free energy larger than that of the perfluorinated polymer powder.

According to the present invention, the composition or film contains in addition to the fluorocarbon polymer powder and the binder, an additive which is a substance having a surface free energy smaller than that of the binder. This additive fills space between the fluorocarbon polymer particles and the binder resin to prevent penetration of water into the coating film. This results in high water repellent properties which last for a prolonged period of time. In other words, with the composition and film of the present invention, a decrease in water repellency will not occur for long time even when used outdoors or with occasional or frequent exposure to water. The coating composition and coating film of the present invention have decreased snow shearing force and, hence, are excellent in antisnow-sticking properties.

The above and other objects, effects, features and advantages of the present invention will become more apparent from the following description of embodiments thereof taken in conjunction with the accompanying drawings.

DETAILED DESCRIPTION OF THE INVENTION

Figure 1A:
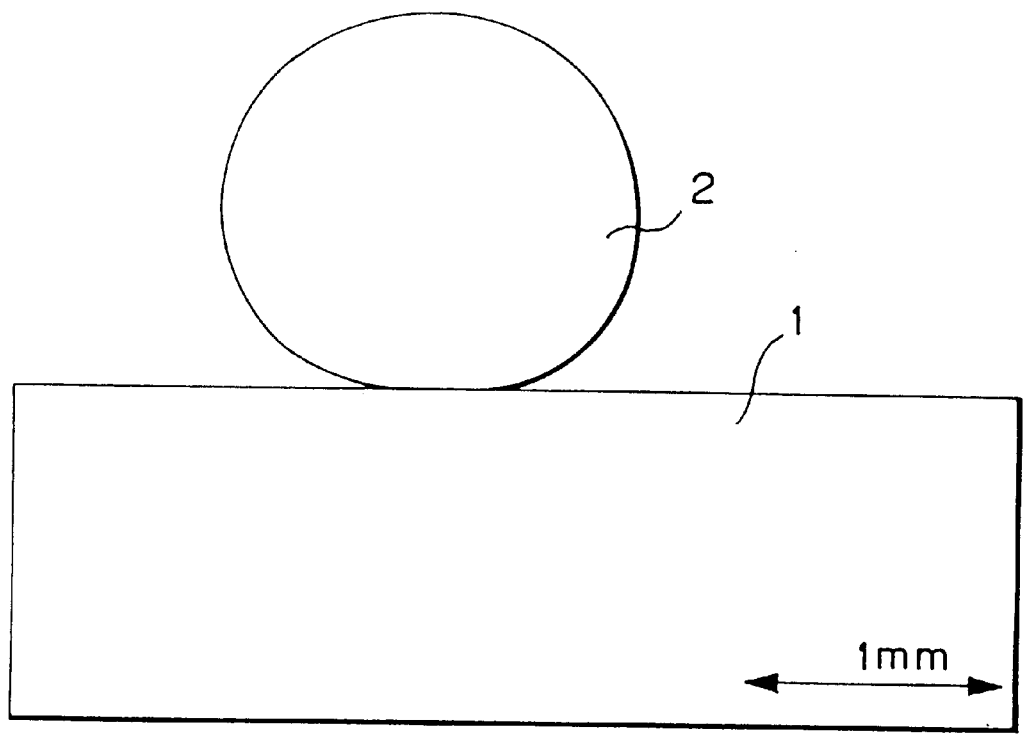
FIG. 1A is a schematic cross-sectional view showing a water drop on a coating film according to an embodiment of the present invention.

The conventional two-component fluorocarbon polymer coating composition forms films which have surfaces in which the fluorocarbon polymer particles and the binder do not wet with each other due to a large difference in surface free energy between the two components. The films have a structure in which part or whole of the respective fluorocarbon polymer particles emerge from the surface of the binder. With the films having such a structure, a decrease in water repellent properties due to a prolonged immersion in water is observed. This is caused by the presence of gaps formed between the fluorocarbon polymer particles and the binder. It is considered that water penetrates into the gaps gradually and is trapped therein, thus causing a decrease in water repellent properties of the film. Denaturation or change in structure of the binder exposed on the surface of the film is considered to be a possible cause of a decrease in water repellent properties.

As a result of intensive investigation, the present inventors have found that the deterioration with time of water repellent properties observed with the conventional two-component fluorocarbon polymer coating compositions and films is caused by existence of gaps formed between the fluorocarbon polymer particles and the binder due to poor wettability of the two components with each other since they have surface free energies differing considerably from each other and that removal or reduction of the gaps realizes improved water repellent properties. The present invention is completed based on this discovery.

As described above, the present invention is directed to water repellent composition, coating composition and coating film which contains fluorocarbon polymer powder and a binder and an additive which is a substance having a surface free energy smaller than that of the binder. Existence of the additive improves wettability of the fluorocarbon polymer particles with the binder so that the occurrence of gaps between the fluorocarbon polymer particles and the binder can be prevented effectively.

That is, the fluorocarbon polymer particles mix well with the additive or binder to reduce the gaps or spaces between the respective fluorocarbon polymer particles. Since the additive has a surface free energy smaller than that of the binder, the additive covers therewith the binder on the surface of the resulting coating film. In a preferred embodiment, the fluorocarbon polymer powder has a surface free energy, as fluorocarbon polymer powder which is smaller than those of the additive and binder, respectively, so that the particles of fluorocarbon polymer powder near the surface of the additive or binder emerge partly from the surface of the film and are exposed to the environmental atmosphere.

From the foregoing, the structure of the coating film of the present invention is considered to comprise a mixture of the additive or binder with the fluorocarbon polymer particles with gaps between the respective fluorocarbon polymer powder being minimized or completely filled with the additive or binder. In the present invention, the binder on the surface of the coating film is covered with the additive and is not or rarely exposed to the ambient atmosphere. This is contrary to the case where a conventional two-component coating composition is used where the binder is uncovered on the surface of the resulting coating film.

For this reason, the coating film of the present invention is prevented from the occurrence of deterioration with time of water repellent properties so that a decrease in water repellent properties can be prevented even after a prolonged immersion in water.

In addition, existence of the additive that has a surface free energy smaller than that of the binder on the surface of the coating film as exposed to the ambient atmosphere decreases ice adhesion or sticking on the surface of the coating film.

The fluorocarbon polymer particles which can be used in the coating composition and coating film of the present invention includes, for example, polytetrafluoroethylene powder, tetrafluoroethylene/hexafluoropropylene copolymer powder, polyvinylidene fluoride powder. These fluorocarbon polymer particles can be used singly or in combination.

The fluorocarbon polymer particles comprise polymers which have terminal groups that are partially fluorinated or completely fluorinated (perfluorinated).

Preferably, the fluorocarbon polymer powder has a particle size of 1 to 100 $\mu$m.

In the water repellent material, coating composition and coating film of the present invention, the fluorocarbon polymer, for example, polytetrafluoroethylene, has a molecular weight of preferably 500 to 20,000. This is because when the molecular weight of the fluorocarbon polymer is below 500, the bondings connected to carbon atoms cannot be fluorinated completely and nonfluorinated carbons tend to form carbonyl groups or the like in the skeleton that are capable of forming hydrogen bonds with molecules of water, thus deteriorating water repellent properties and water-proofing properties of the coating film.

The fluorocarbon polymer powder can be prepared by a conventional method. In this case, it is preferred that the fluorocarbon polymer powder be prepared under controlled conditions such that a high degree of fluorination can be attained and the concentration of oxygen in the ambient atmosphere is maintained at a level not higher than 0.1%.

As the binder, there can be used polyvinylidene fluorides, polytetrafluoroethylenes, acrylic silicone resins, polyesters, ethylene/carbon monoxide copolymers, ethylene/vinylketone copolymers, propylene/vinylketone copolymers, and styrene/vinylketone copolymers. These binder resins can be used singly or in combination.

The ethylene/carbon monoxide copolymers, ethylene/vinylketone copolymers, propylene/vinylketone copolymers, styrene/vinylketone copolymers and the like are photodegrading resins which photochemically decompose upon exposure to sunlight to have decreased molecular weights and tend to become brittle so that they will readily be broken down when exposed to the weather. However, these binder resins can also be used in the present invention. When the fluorocarbon polymer powder is dispersed in the above-described binder in amounts of preferably 5 to 90% by volume, a self-regenerating type water repellent coating composition can be obtained in which always new water repellent surfaces appear due to the above-described breaking down of the photodegrading resin. The preferred content of the fluorocarbon polymer powder of 5 to 90% by volume is selected for the following reasons. With below 5% by volume of the fluorocarbon polymer powder, no sufficient water repellent effect can be obtained while with above 90% by volume of the fluorocarbon polymer powder, the sunlight is shielded by the fluorocarbon polymer particles so that breaking down of the above-described binder resins is sometimes deterred, resulting in a delayed self-regeneration of water repelling effect.

The additive which can be used in the present invention is not limited particularly as far as it has a surface free energy smaller than that of the binder. Suitable binders include fluoro oils and surfactants. These can be used singly or in combination.

Examples of the fluoro oils include perfluorinated polyethers, perfluorinated alkyl polyethers, polytrifluoroethylene, and mixtures thereof.

Preferred surfactant is, for example, a fluorocarbon surfactant.

In the present invention, the surface free energy of the additive must be larger than that of the fluorocarbon polymer powder.

Among the fluoro oil and fluorocarbon surfactants, particularly preferred are those listed in Table 1 below.

TABLE 1

| Kind of Additive | Name of Additive | Surface Free Energy (mN/m) |
| --- | --- | --- |
| Fluoro Oil | Perfluorinated polyether (M.W. = 2,700) | 17.7 |
| Fluoro Oil | Perfluorinated polyether (M.W. = 4,500) | 18.4 |
| Fluoro Oil | Perfluorinated polyether (M.W. = 5,600) | 18.5 |
| Fluoro Oil | Perfluorinated polyether (M.W. = 8,400) | 19.1 |
| Surfactant | Perfluorinated alkyl carboxylic acid salt | 44.6 |
| Surfactant | Perfluorinated alkyl quaternary ammonium salt | 34.0 |
| Surfactant | Perfluorinated alkyl ethylene oxide adduct | 17.4 |
| Surfactant | Perfluorinated alkyl oligomer | 26.4 |

*) Chemical structure of fluoro oil (perfluorinated polyether:

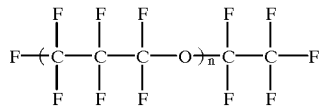

The coating composition of the present invention can be coated on a substrate or an article to be coated directly. Alternatively, there may be applied to the substrate or article to be coated at least one of or mixtures of resins selected from acrylic silicone resin, polyester resin, epoxy resin, acrylic resin, urethane resin, phthalic acid resin, fluorocarbon resin, vinyl resin before the coating composition of the present invention can be coated thereon. Furthermore, the water repellent coating composition of the present invention may be applied to a substrate or article after it is coated with a water repellent coating composition comprising at least one of acrylic silicone resin, polyester resin, epoxy resin, acrylic resin, urethane resin, phthalic acid resin, fluorocarbon resin, or vinyl resin and fluorocarbon polymer powder having a molecular weight of 500 to 20,000 and containing fluorinated terminal groups in amounts of 5 to 90% by volume and the volatile components therein is evaporated.

DESCRIPTION OF THE PREFERRED EMBODIMENTS

Hereafter, the present invention is described in more detail by embodiments. However, the present invention should not be construed as being limited thereto.

Embodiment 1

Using a ball mill were prepared three-component formulations which consisted of 80% by volume of powder of polytetrafluoroethylene having an average molecular weight of 8,500 and a particle diameter of 4 μm as fluorocarbon polymer powder, 19.5% by volume of polyvinylidene fluoride as a binder, and 0.5% by volume of perfluorinated polyether having a varied molecular weight as a fluoro oil. As the perfluorinated polyether were used four kinds of polymers having different molecular weights: M.W.=2,700, 4,500, 5,600, and 8,400, respectively. These fluorocarbon polymer coating compositions were sprayed on respective fiber reinforced plastics (FRP) plates mainly comprised by an epoxy resin to prepare samples for evaluating the effect of the present invention. Separately, four coating composition formulations were prepared in the same way as above except that four kinds of fluorocarbon surfactants having surface free energies of 17.4, 26.4, 34.0, and 44.6 mN/m, respectively, in an amount of 0.5% by volume were used instead of the above-described fluoro oil. The resulting coating compositions were sprayed onto FRP plates mainly comprised by an epoxy resin containing glass fiber to prepare samples for evaluating the effect of the present invention.

Comparative Embodiment 1

A coating composition of Comparative Embodiment 1 was prepared by mixing 80% by volume of the same polytetrafluoroethylene powder as used in Embodiment 1 and 20% by volume of polyvinylidene fluoride as a binder using a ball mill. The coating composition thus obtained was sprayed onto an FRP plate comprised mainly by an epoxy resin to prepare a comparative sample.

TEST EXAMPLE 1

First, water repellent properties of the samples obtained in Embodiment 1 and Comparative Embodiment 1 are described below.

Figure 1B:
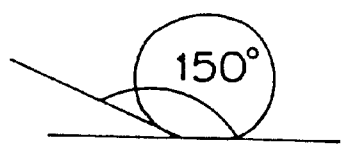
FIG. 1B is a schematic diagram illustrating a water contact angle of the water drop on the coating film shown in FIG. 1A.
Figure 2:
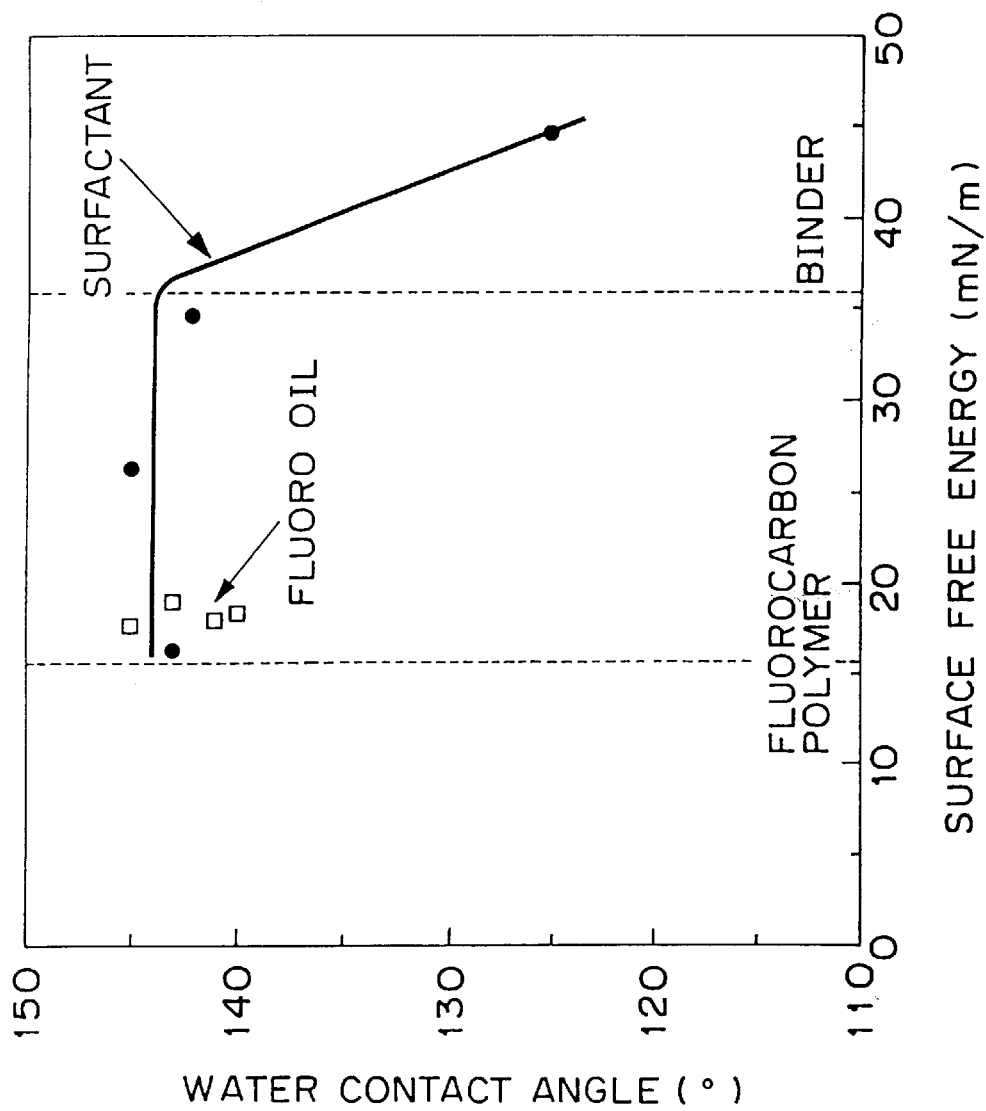
FIG. 2 is a graph illustrating relationship between a surface free energy of an additive and water contact angle.

Contact angle of water (hereafter, referred to as water contact angle) is well known as an index of water repellent properties, with larger contact angle indicating higher water repellent properties. The water repellent properties of the samples were measured using a contact angle measuring system manufactured by KYOWA KAIMEN KAGAKU CO., LTD. More particularly, a water droplet of about 4 μl ($4 \times 10^{-9}$ m$^3$) was dropped on a surface of each coating film and water contact angles were measured. FIG. 1 is a schematic diagram illustrating a water droplet on the coating film of Embodiment 1. In FIG. 1A, a water droplet 2 is on a coating film 1. FIG. 1B is a schematic diagram illustrating measurement of water contact angle. Measurements were mace at room temperature (23° C.) and an average value was calculated from 5 measured values. In the case of perfluorinated polyether having a molecular weight of 2,700, water contact angle was 150°. The perfluorinated polyether having molecular weight of 4,500, 5,600, and 8,400, respectively, showed a water contact angle of 140°. FIG. 2 shows water contact angles measured when various additives having different surface free energy were added to the coating compositions. More particularly, FIG. 2 illustrates relationship between the surface free energy, (mN/m) of additive and the water contact angle (°). In FIG. 2, filled circles indicate a surfactant-based additive, and blank squares indicate a fluoro oil-base additive. As described earlier, Table 1 lists up specific examples of fluoro oil and of surfactants used as the additive. Use of additives having surface free energies smaller than that of the binder resin gives water contact angles of not smaller than 140°. On the other hand, addition of the additive having a surface free energy larger than that of the binder results in failure of giving high water contact angles. For ease of understanding, FIG. 2 also illustrates respective average surface free energies of fluorocarbon polymer powder and polyvinylidene fluoride as a binder by dot lines (cf. Yoshiaki Kitasaki, Hata, Toshio, Nippon Secchaku Kyokai Shi, Vol. 8, page 131 (1972), E. G. Shafrin and W. A. Zisman, Journal of Physical Chemistry, Vol. 64, page 519 (1972)).

On the other hand, the sample of Comparative Embodiment 1 had a water contact angle of 140°. From these data, it follows that addition of an additive having a surface free energy smaller than that of the binder gives a coating film having water repellent properties equivalent to those of the two-component fluorocarbon polymer coating composition.

TEST EXAMPLE 2

Figure 3:
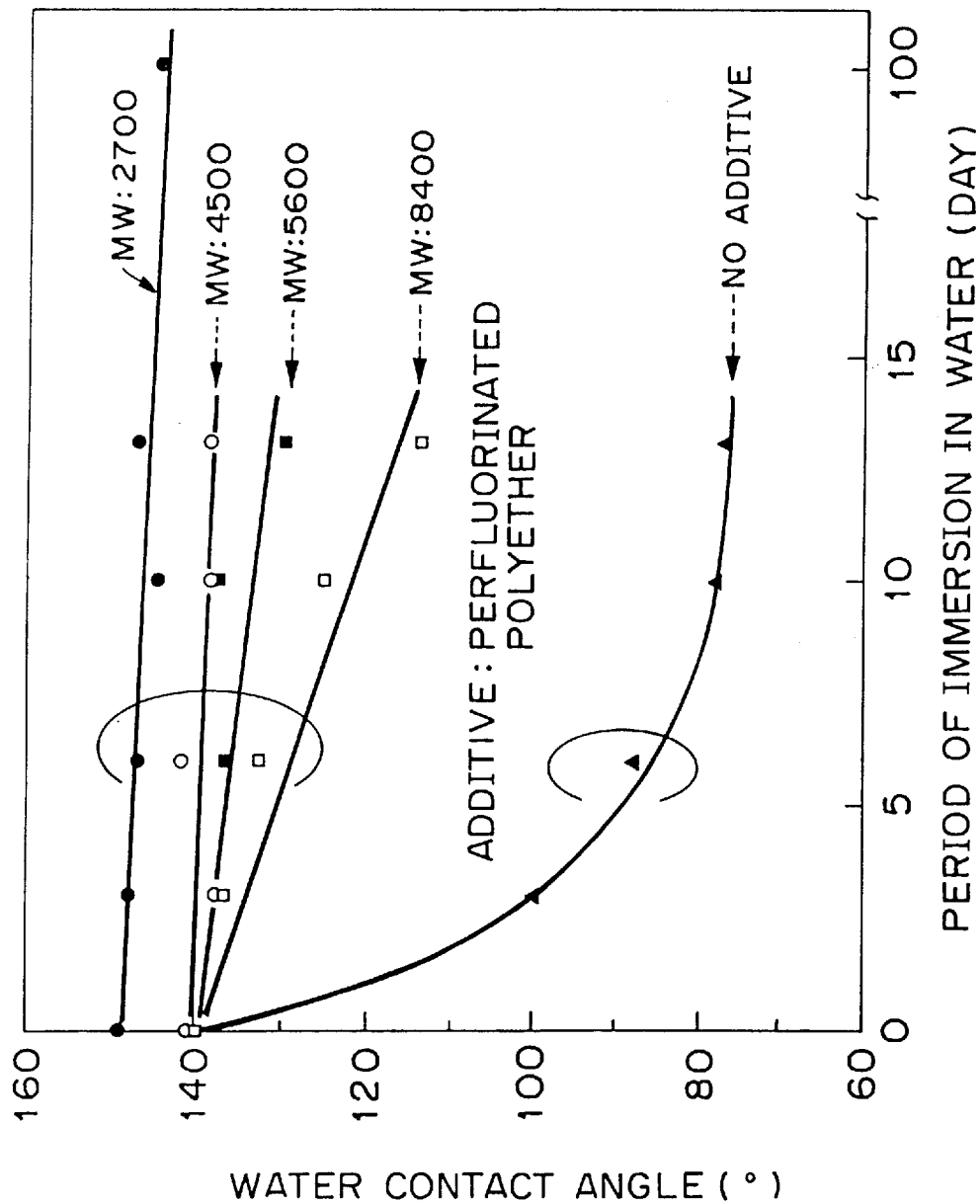
FIG. 3 is a graph illustrating time-dependent changes of water repellent properties of fluoro oil-containing coating film samples when immersed in water.

Next, explanation will be made of deterioration with time of water repellent properties as a result of water immersion test. FIG. 3 is a graph which illustrates relationship between period (numbers of day) of immersion in water and water repellent properties of films made from fluorocarbon polymer coating compositions containing as the additive described above four types of perfluorinated polyethers with different molecular weights, respectively, according to Embodiment 1 of the present invention. For comparison, FIG. 3 also shows water repellent properties of the sample of Comparative Embodiment 1. More particularly, FIG. 3 is a graph illustrating time dependent change in water repellent properties of fluoro oil-containing sample films when immersed in water, with the horizontal axis (axis of abscissa) indicating period of immersion in water (day) and the vertical axis (axis of ordinate) indicating water contact angle (°). Symbols filled circle, blank circle, filled square and blank square designate the cases where the perfluorinated polyethers used had molecular weights of 2,700, 4,500, 5,600, and 8,400, respectively. Filled triangle designates the case where no additive was used. The coating film samples prepared from the coating compositions according to Embodiment 1 of the present invention were immersed in deionized water and taken out after respective predetermined days, followed by measuring water contact angles by the above-described method. This operation was repeated and evaluation was made of effects of a long-term immersion in water. The samples obtained by coating the fluorocarbon polymer coating composition of the present invention showed less deterioration with time of water repellent properties as compared with the sample of Comparative Embodiment 1 and are superior in a long-term water resistance. In particular, the sample containing the fluoro oil having a molecular weight of 2,700 retained a high initial water repellent property even after immersion in water for 100 days. As for the perfluorinated polyether used as the additive in the present invention, more preferred are those which have a molecular weight of not larger than 5,600 in view of resistance to long-term water immersion. Further, it is preferred that the fluorocarbon polymer powder is contained in an amount of not smaller than 30% by volume based on the total volume of the coating composition or film. Further, it is more preferred that the coating composition or coating film of the present invention contain the fluorocarbon polymer powder in amounts of not less than 30% by volume. The amount of the additive is preferably not more than 10% by volume since the fluorocarbon polymer powder can be dispersed uniformly in the binder when the additive exists in amounts not more than 10% by volume.

The sample of Comparative Embodiment 1 was evaluated for the surface of the coating composition in the same manner as described above. As a result water contact angle of 140° was observed. Although no remarkable difference in initial water repellent properties just after formation of coating films was observed among the samples containing the fluorocarbon polymer powder having molecular weights other than 2,700, the fluorocarbon polymer coating composition and coating film of the present invention were confirmed to be superior to the conventional fluorocarbon polymer coating composition and film in resistance to long-term water immersion.

Figure 4:
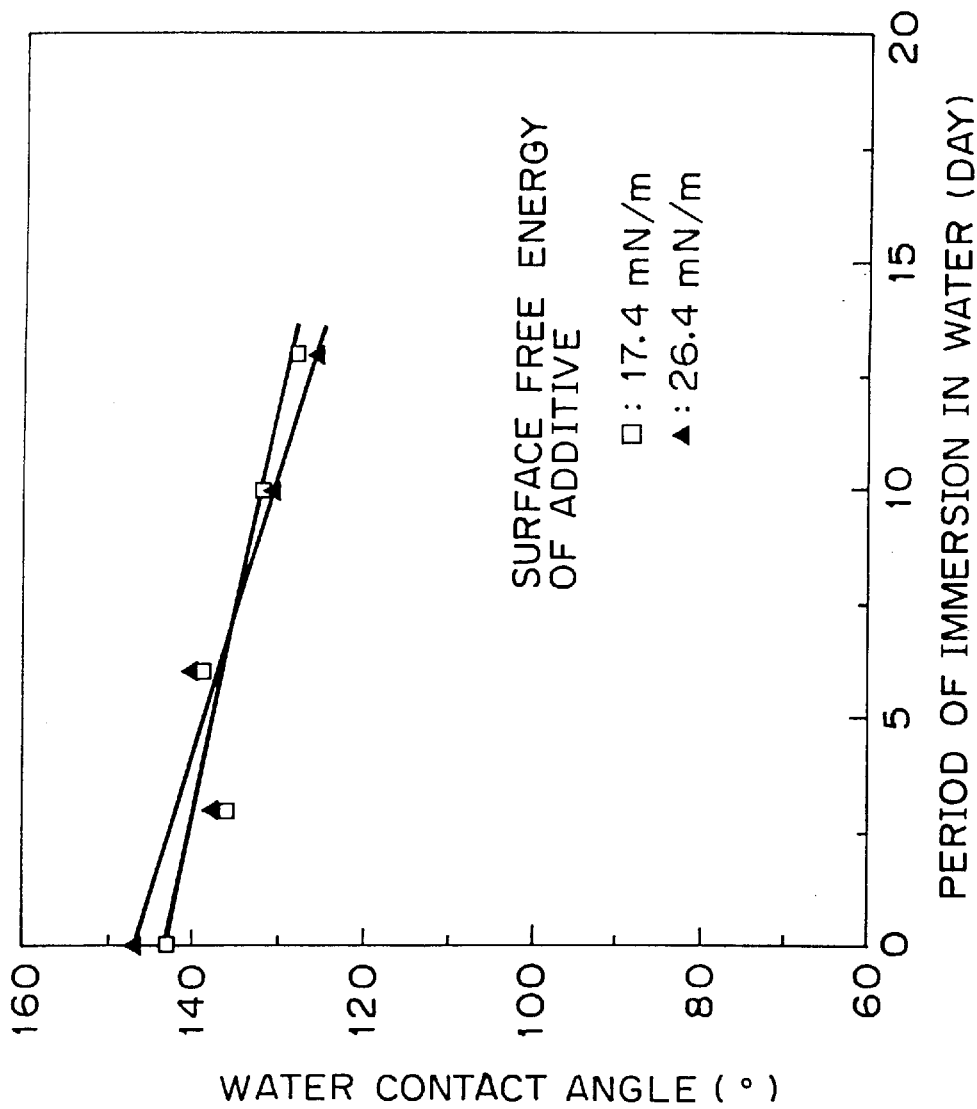
FIG. 4 is a graph illustrating time-dependent changes of water repellent properties of surfactant-containing coating film samples when immersed in water.
Figure 5A:
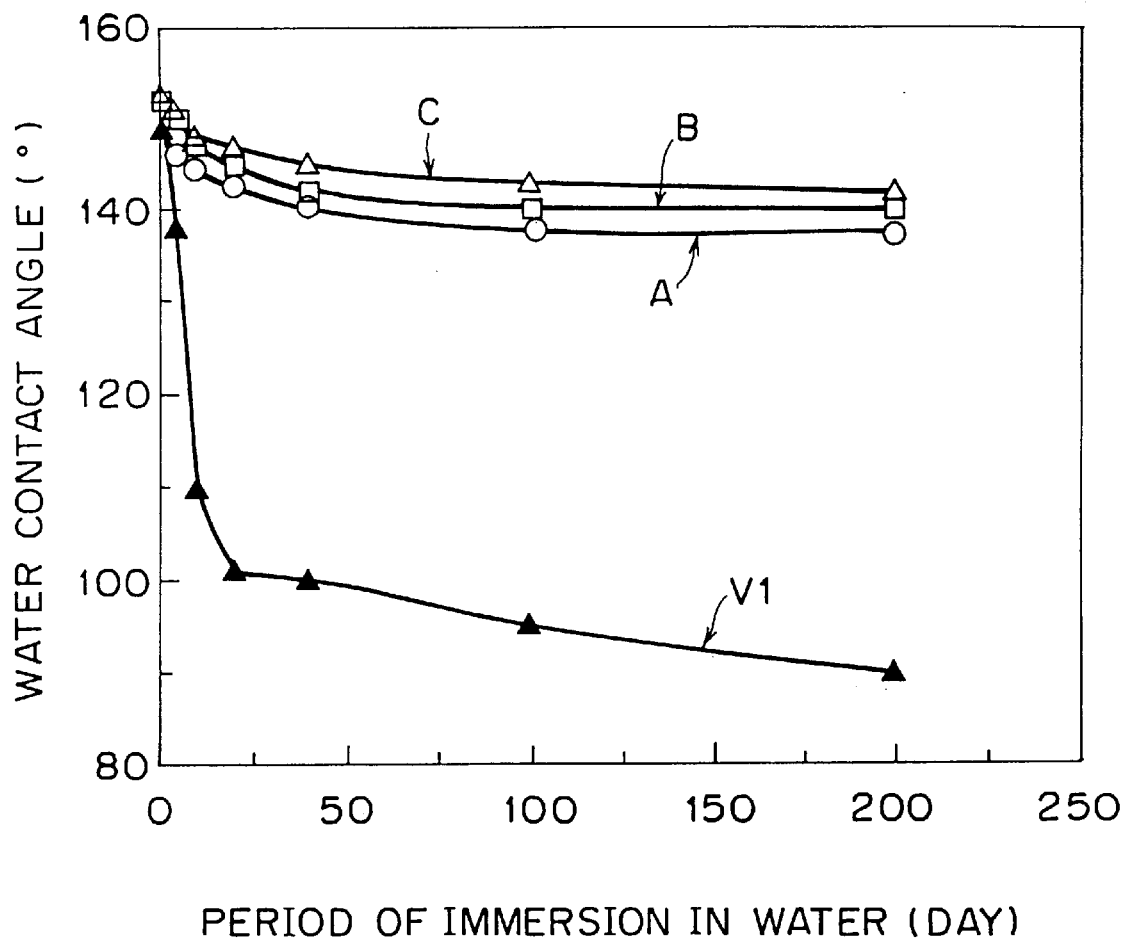
FIG. 5A is a graph illustrating time-dependent changes of water repellent properties of coating film samples containing various amounts of fluoro oil when immersed in water.
Figure 5B:
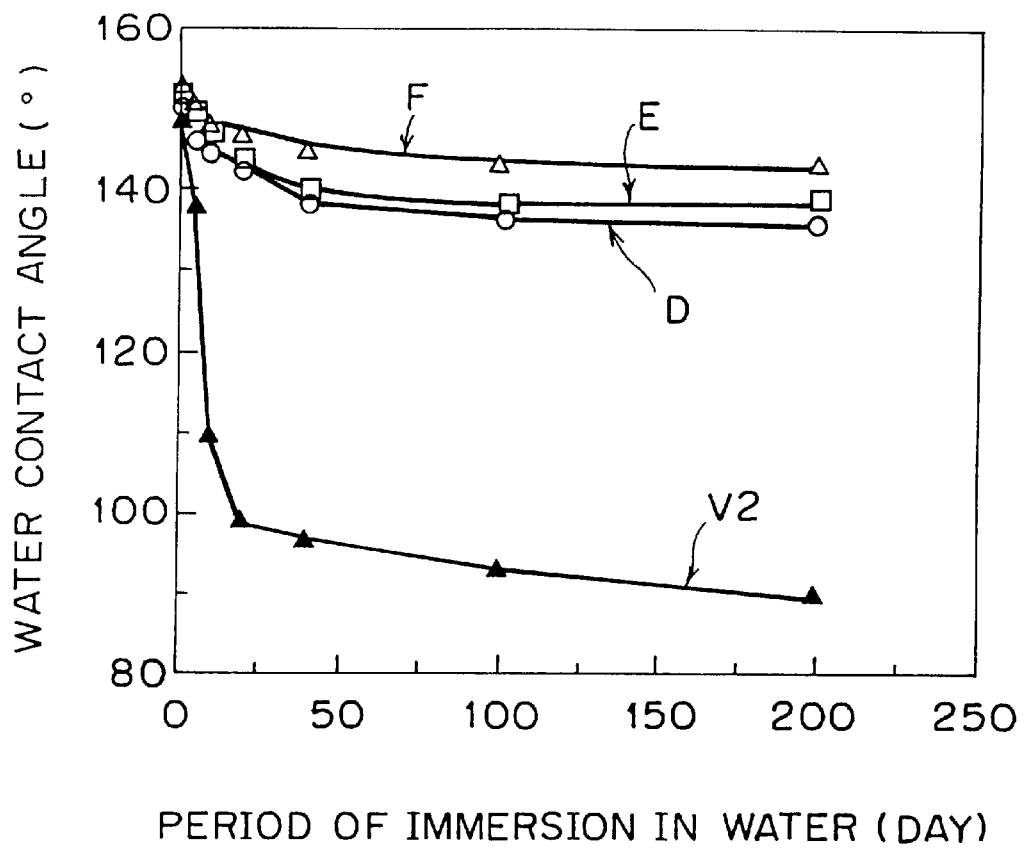
FIG. 5B is a graph illustrating time-dependent changes of water repellent properties of coating film samples containing various amounts of fluoro oil when immersed in water.
Figure 5C:
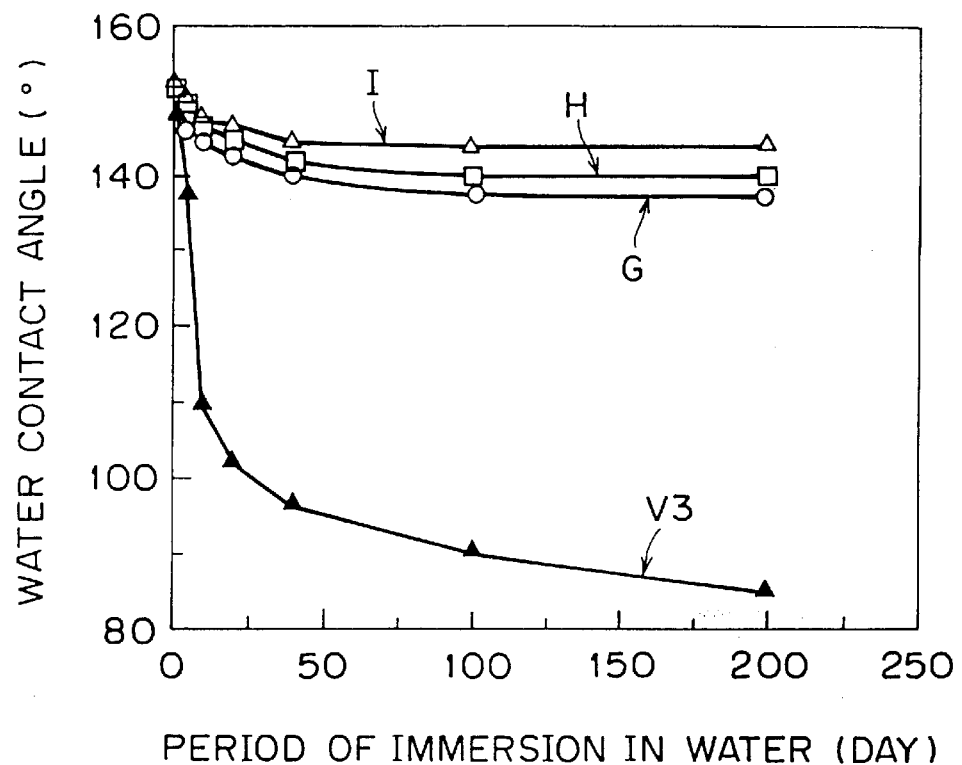
FIG. 5C is a graph illustrating time-dependent changes of water repellent properties of coating film samples containing various amounts of fluoro oil when immersed in water.
Figure 5D:
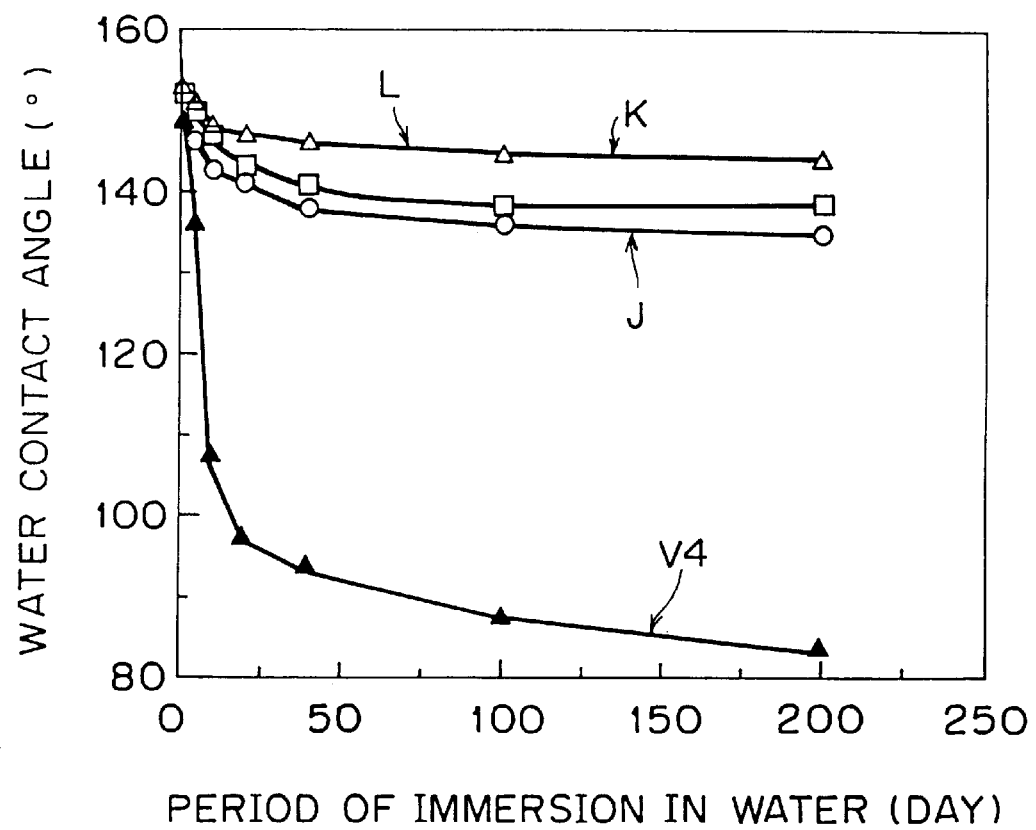
FIG. 5D is a graph illustrating time-dependent changes of water repellent properties of coating film samples containing various amounts of fluoro oil when immersed in water.
Figure 5E:
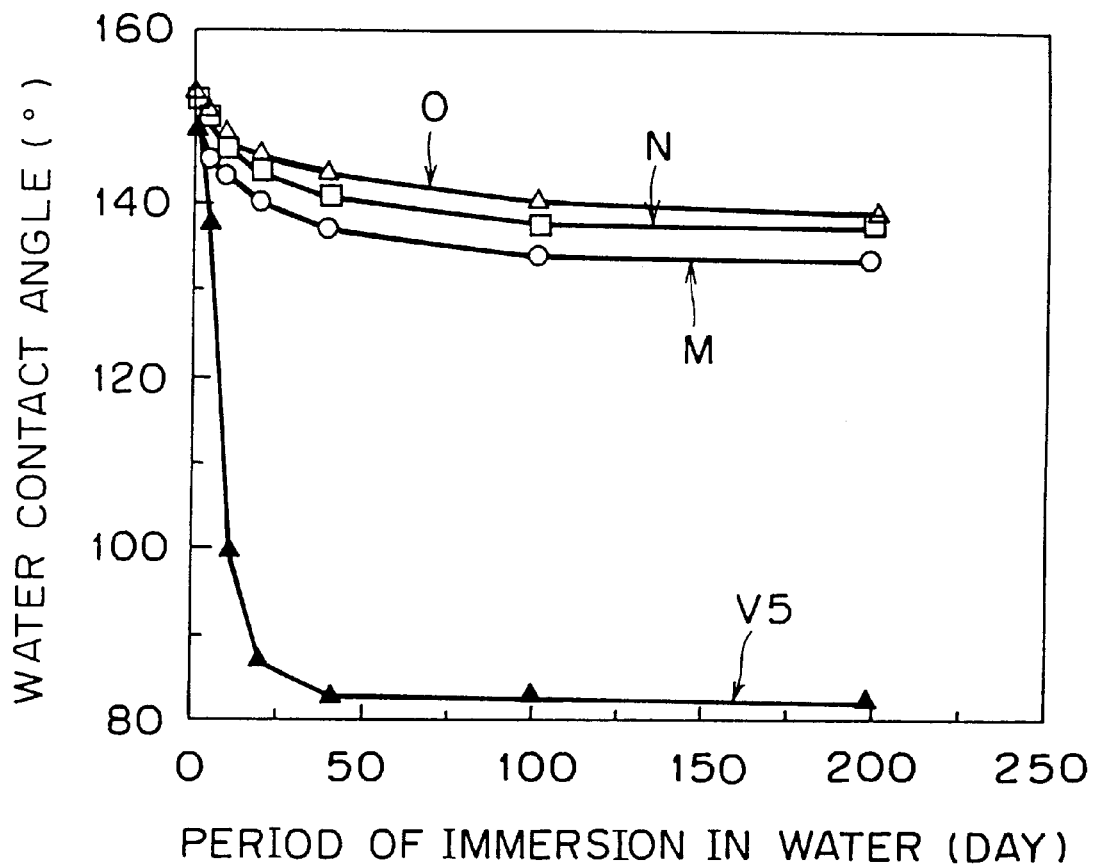
FIG. 5E is a graph illustrating time-dependent changes of water repellent properties of coating film samples containing various amounts of fluoro oil when immersed in water.

FIG. 4 is a graph illustrating relationship between period of immersion in water and water repellent properties of coating film samples made from the fluorocarbon polymer coating composition according to Embodiment 1 of the present invention containing 0.5% by volume of a fluorocarbon surfactant as the additive. More particularly, FIG. 4 is a graph illustrating time dependent change in water repellent properties of fluorocarbon surfactant-containing sample films when immersed in water, with the horizontal axis (axis of abscissa) indicating period of immersion in water (day) and the vertical axis (axis of ordinate) indicating water contact angle (°). As for symbols, blank square and filled triangle designate the cases where the perfluorinated polyethers used had surface free energies of 17.4 mN/m and 26.4 mN/m, respectively.

Evaluation of water repellent properties of the resulting film samples were made in the same manner as described above and as a result the both samples showed less decreased water repellent properties than the sample of Comparative Embodiment 1 as illustrated in FIG. 3. This clearly indicates that the samples of the invention had long-term resistance to water.

TEST EXAMPLE 3

In order to compare ice adhesion, ice was allowed to adhere on coating films and snow sticking shearing force was measured using a snow sticking force tester. The tester is a device with which cylindrical ice piece of 32 mm in diameter deposited on the surface of a coating film sample is pulled at a constant speed in the direction parallel to the surface of the coating film and a change in load until the ice is released by means of a load cell. The maximum load is defined as the snow sticking shearing force of the film sample tested. Shearing stresses were measured of a sample obtained by spraying a coating composition containing 0.5% by volume of perfluorinated polyether (molecular weight: 2,700) as an additive and the sample of Comparative Embodiment 1. The measurement was repeated 5 times each and average values were calculated. The coating film of Embodiment 1 had a snow sticking shearing stress of 23 g/cm$^2$ while the sample of Comparative Embodiment 1 had a snow sticking shearing stress of 55 g/cm$^2$. Thus, it was confirmed that the coating composition of the present invention had a snow sticking shearing stress smaller than the two-component coating composition of Comparative Embodiment 1 and snow deposited on the coating film made from the coating composition of the present invention released readily. Therefore, the present invention is superior in improvement of water repellent properties of coating composition and film over the prior art.

Next, in Embodiments 2 to 31 and Comparative Embodiments 2 to 31 below, were examined deterioration with time of water repellent properties of coating films containing various kinds of fluorocarbon polymer powders, binders and additives.

Embodiment 2

Polytetrafluoroethylene (molecular weight: 8,500, average particle diameter: 1 μm) as a fluorocarbon polymer powder, polyvinylidene fluoride as a binder, and perfluorinated polyether molecular weight: 2,700) as an additive were mixed in the proportions shown in Table 2-1 in a ball mill to prepare fluorocarbon polymer coating compositions containing various amounts of the additive. These fluorocarbon polymer coating compositions were sprayed on respective FRP plates comprised mainly by an epoxy resin to prepare coating film samples for evaluation of the effect of the present invention. Table 2-1 shows the compositions of samples A to C of Embodiment 2 in which the content (volume percentage) of the polyvinylidene fluoride and perfluorinated polyether were varied.

Comparative Embodiment 2

Eighty (80) percents by volume of the same polytetrafluoroethylene powder as used in Embodiment 2 as a fluorocarbon polymer powder and 20% by volume of polyvinylidene fluoride as a binder were mixed to prepare a fluorocarbon polymer coating composition. The fluorocarbon polymer coating composition thus obtained was sprayed on an FRP plate comprised mainly by an epoxy resin to prepare a coating film sample for evaluation of its water repellent properties. Table 2-1 shows the composition of the comparative coating film sample V1.

Embodiment 3

Fluorocarbon polymer coating compositions were prepared in the same manner as in Embodiment 2 except that polytetrafluoroethylene was used as the binder. Coating films were prepared from these coating compositions in the same manner as in Embodiment 2. Table 2-1 shows the compositions of sample films D, E, and F with varied amounts of polytetrafluoroethylene as the binder and perfluorinated polyether as the additive.

Comparative Embodiment 3

Eighty (80) percents by volume of the same polytetrafluoroethylene powder as used in Embodiment 2 as a fluorocarbon polymer powder and 20% by volume of polytetrafluoroethylene as a binder were mixed to prepare a fluorocarbon polymer coating composition. A coating film from this fluorocarbon polymer coating composition was prepared in the same manner as in Embodiment 2. Table 2-1 shows the composition of the comparative coating film sample V2.

Embodiment 4

Fluorocarbon polymer coating compositions were prepared in the same manner as in Embodiment 2 except that acrylic silicone resin was used as the binder. Coating films were prepared from these coating compositions in the same manner as in Embodiment 2. Table 2-1 shows the compositions of sample films G, H and I with varied amounts of acrylic silicone resin as the binder and perfluorinated polyether as the additive.

Comparative Embodiment 4

Eighty (80) percents by volume of the same polytetrafluoroethylene powder as used in Embodiment 2 as a fluorocarbon polymer powder and 20% by volume of acrylic silicone resin as a binder were mixed to prepare a fluorocarbon polymer coating composition. A coating film from this fluorocarbon polymer coating composition was prepared in the same manner as in Embodiment 2. Table 2-1 shows the composition of the comparative coating film sample V3.

Embodiment 5

Fluorocarbon polymer coating compositions were prepared in the same manner as in Embodiment 2 except that polyester resin was used as the binder. Coating films were prepared from these coating compositions in the same manner as in Embodiment 2. Table 2-1 shows the compositions of sample films J, K and L with varied amounts of polyester resin as the binder and perfluorinated polyether as the additive.

Comparative Embodiment 5

Eighty (80) percents by volume of the same polytetrafluoroethylene powder as used in Embodiment 2 as a fluorocarbon polymer powder and 20% by volume of polyester resin as a binder were mixed to prepare a fluorocarbon polymer coating composition. A coating film from this fluorocarbon polymer coating composition was prepared in the same manner as in Embodiment 2. Table 2-1 shows the composition of the comparative coating film sample V4.

Embodiment 6

Fluorocarbon polymer coating compositions were prepared in the same manner as in Embodiment 2 except that epoxy resin was used as the binder. Coating films were prepared from these coating compositions in the same manner as in Embodiment 2. Table 2-1 shows the compositions of sample films M, N and O with varied amounts of epoxy resin as the binder and perfluorinated polyether as the additive.

Comparative Embodiment 6

Eighty (80) percents by volume of the same polytetrafluoroethylene powder as used in Embodiment 2 as a fluorocarbon polymer powder and 20% by volume of epoxy resin as a binder were mixed to prepare a fluorocarbon polymer coating composition. A coating film from this fluorocarbon polymer coating composition was prepared in the same manner as in Embodiment 2. Table 2-1 shows the composition of the comparative coating film sample V5.

Embodiment 7

Fluorocarbon polymer coating compositions were prepared in the same manner as in Embodiment 2 except that perfluorinated alkyl polyether was used as the additive. Coating films were prepared from these coating compositions in the same manner as in Embodiment 2. Table 2-2 shows the compositions of sample films A-1, B-1 and C-1 with varied amounts of polyvinylidene fluoride as the binder and perfluorinated alkyl polyether as the additive.

Comparative Embodiment 7

Eighty (80) percents by volume of the same polytetrafluoroethylene powder as used in Embodiment 2 as a fluorocarbon polymer powder and 20% by volume of polyvinylidene fluoride as a binder were mixed to prepare a fluorocarbon polymer coating composition. A coating film from this fluorocarbon polymer coating composition was prepared in the same manner as in Embodiment 2. Table 2-2 shows the composition of the comparative coating film sample V6.

Embodiment 8

Fluorocarbon polymer coating compositions were prepared in the same manner as in Embodiment 3 except that perfluorinated alkyl polyether as used in Embodiment 7 was used as the additive. Coating films were prepared from these coating compositions in the same manner as in Embodiment 2. Table 2-2 shows the compositions of sample films D-1, E-1 and F-1 with varied amounts of polytetrafluoroethylene as the binder and perfluorinated alkyl polyether as the additive.

Comparative Embodiment 8

Eighty (80) percents by volume of the same polytetrafluoroethylene powder as used in Embodiment 2 as a fluorocarbon polymer powder and 20% by volume of polytetrafluoroethylene as a binder were mixed to prepare a fluorocarbon polymer coating composition. A coating film from this fluorocarbon polymer coating composition was prepared in the same manner as in Embodiment 2. Table 2-2 shows the composition of the comparative coating film sample V7.

Embodiment 9

Fluorocarbon polymer coating compositions were prepared in the same manner as in Embodiment 4 except that perfluorinated alkyl polyether as used in Embodiment 7 was used as the additive. Coating films were prepared from these coating compositions in the same manner as in Embodiment 2. Table 2-2 shows the compositions of sample films G-1, H-1 and I-1 with varied amounts of acrylic silicone resin as the binder and perfluorinated alkyl polyether as the additive.

Comparative Embodiment 9

Eighty (80) percents by volume of the same polytetrafluoroethylene powder as used in Embodiment 2 as a fluorocarbon polymer powder and 20% by volume of acrylic silicone resin as a binder were mixed to prepare a fluorocarbon polymer coating composition. A coating film from this fluorocarbon polymer coating composition was prepared in the same manner as in Embodiment 2. Table 2-2 shows the composition of the comparative coating film sample V8.

Embodiment 10

Fluorocarbon polymer coating compositions were prepared in the same manner as in Embodiment 5 except that perfluorinated alkyl polyether as used in Embodiment 7 was used as the additive. Coating films were prepared from these coating compositions in the same manner as in Embodiment 2. Table 2-2 shows the compositions of sample films J-1, K-1 and L-1 with varied amounts of polyester resin as the binder and perfluorinated alkyl polyether as the additive.

Comparative Embodiment 10

Eighty (80) percents by volume of the same polytetrafluoroethylene powder as used in Embodiment 2 as a fluorocarbon polymer powder and 20% by volume of polyester resin as a binder were mixed to prepare a fluorocarbon polymer coating composition. A coating film from this fluorocarbon polymer coating composition was prepared in the same manner as in Embodiment 2. Table 2-2 shows the composition of the comparative coating film sample V9.

Embodiment 11

Fluorocarbon polymer coating compositions were prepared in the same manner as in Embodiment 6 except that perfluorinated alkyl polyether as used in Embodiment 7 was used as the additive. Coating films were prepared from these coating compositions in the same manner as in Embodiment 2. Table 2-2 shows the compositions of sample films M-1, N-1 and O-1 with varied amounts of epoxy resin as the binder and perfluorinated alkyl polyether as the additive.

Comparative Embodiment 11

Eighty (80) percents by volume of the same polytetrafluoroethylene powder as used in Embodiment 2 as a fluorocarbon polymer powder and 20% by volume of epoxy resin as a binder were mixed to prepare a fluorocarbon polymer coating composition. A coating film from this fluorocarbon polymer coating composition was prepared in the same manner as in Embodiment 2. Table 2-2 shows the composition of the comparative coating film sample V10.

Embodiment 12

Fluorocarbon polymer coating compositions were prepared in the same manner as in Embodiment 2 except that polytrifluoroethylene was used as the additive. Coating films were prepared from these coating compositions in the same manner as in Embodiment 2. Table 2-3 shows the compositions of sample films A-2, B-2 and C-2 with varied amounts of polyvinylidene fluoride as the binder and polytrifluoroethylene as the additive.

Comparative Embodiment 12

Eighty (80) percents by volume of the same polytetrafluoroethylene powder as used in Embodiment 2 as a fluorocarbon polymer powder and 20% by volume of polyvinylidene fluoride as a binder were mixed to prepare a fluorocarbon polymer coating composition. A coating film from this fluorocarbon polymer coating composition was prepared in the same manner as in Embodiment 2. Table 2-3 shows the composition of the comparative coating film sample V11.

Embodiment 13

Fluorocarbon polymer coating compositions were prepared in the same manner as in Embodiment 3 except that polytrifluoroethylene as used in Embodiment 12 was used as the additive. Coating films were prepared from these coating compositions in the same manner as in Embodiment 2. Table 2-3 shows the compositions of sample films D-2, E-2 and F-2 with varied amounts of polytetrafluoroethylene as the binder and polytrifluoroethylene as the additive.

Comparative Embodiment 13

Eighty (80) percents by volume of the same polytetrafluoroethylene powder as used in Embodiment 2 as a fluorocarbon polymer powder and 20% by volume of polytetrafluoroethylene as a binder were mixed to prepare a fluorocarbon polymer coating composition. A coating film from this fluorocarbon polymer coating composition was prepared in the same manner as in Embodiment 2. Table 2-3 shows the composition of the comparative coating film sample V12.

Embodiment 14

Fluorocarbon polymer coating compositions were prepared in the same manner as in Embodiment 4 except that polytrifluoroethylene as used in Embodiment 12 was used as the additive. Coating films were prepared from these coating compositions in the same manner as in Embodiment 2. Table 2-3 shows the compositions of sample films G-2, H-2 and I-2 with varied amounts of acrylic silicone resin as the binder and polytrifluoroethylene as the additive.

Comparative Embodiment 14

Eighty (80) percents by volume of the same polytetrafluoroethylene powder as used in Embodiment 2 as a fluorocarbon polymer powder and 20% by volume of acrylic silicone resin as a binder were mixed to prepare a fluorocarbon polymer coating composition. A coating film from this fluorocarbon polymer coating composition was prepared in the same manner as in Embodiment 2. Table 2-3 shows the composition of the comparative coating film sample V13.

Embodiment 15

Fluorocarbon polymer coating compositions were prepared in the same manner as in Embodiment 5 except that polytrifluoroethylene as used in Embodiment 12 was used as the additive. Coating films were prepared from these coating compositions in the same manner as in Embodiment 2. Table 2-3 shows the compositions of sample films J-2, K-2 and L-2 with varied amounts of polyester resin as the binder and polytrifluoroethylene as the additive.

Comparative Embodiment 15

Eighty (80) percents by volume of the same polytetrafluoroethylene powder as used in Embodiment 2 as a fluorocarbon polymer powder and 20% by volume of polyester resin as used in Embodiment 5 as a binder were mixed to prepare a fluorocarbon polymer coating composition. A coating film from this fluorocarbon polymer coating composition was prepared in the same manner as in Embodiment 2. Table 2-3 shows the composition of the comparative coating film sample V14.

Embodiment 16

Fluorocarbon polymer coating compositions were prepared in the same manner as in Embodiment 6 except that polytrifluoroethylene as used in Embodiment 12 was used as the additive. Coating films were prepared from these coating compositions in the same manner as in Embodiment 2. Table 2-3 shows the compositions of sample films M-2, N-2 and O-2 with varied amounts of epoxy resin as the binder and polytrifluoroethylene as the additive.

Comparative Embodiment 16

Eighty (80) percents by volume of the same polytetrafluoroethylene powder as used in Embodiment 2 as a fluorocarbon polymer powder and 20% by volume of epoxy resin as used in Embodiment 6 as a binder were mixed to prepare a fluorocarbon polymer coating composition. A coating film from this fluorocarbon polymer coating composition was prepared in the same manner as in Embodiment 2. Table 2-3 shows the composition of the comparative coating film sample V15.

Embodiment 17

Fluorocarbon polymer coating compositions were prepared in the same manner as in Embodiment 2 except that tetrafluoroethylene/hexafluoropropylene copolymer powder was used as the fluorocarbon polymer powder. Coating films were prepared from these coating compositions in the same manner as in Embodiment 2. Table 2-4 shows the compositions of sample films A-3, B-3 and C-3 with varied amounts of polyvinylidene fluoride as the binder and perfluorinated polyether as the additive.

Comparative Embodiment 17

Eighty (80) percents by volume of the same tetrafluoroethylene/hexafluoroethylene copolymer powder as used in Embodiment 17 as a fluorocarbon polymer powder and 20% by volume of polyvinylidene fluoride as a binder were mixed to prepare a fluorocarbon polymer coating composition. A coating film from this fluorocarbon polymer coating composition was prepared in the same manner as in Embodiment 2. Table 2-4 shows the composition of the comparative coating film sample V16.

Embodiment 18

Fluorocarbon polymer coating compositions were prepared in the same manner as in Embodiment 3 except that tetrafluoroethylene/hexafluoropropylene copolymer powder as used in Embodiment 17 was used as the fluorocarbon polymer powder. Coating films were prepared from these coating compositions in the same manner as in Embodiment 2. Table 2-4 shows the compositions of sample films D-3, E-3, and F-3 with varied amounts of polytetrafluoroethylene as the binder and perfluorinated polyether as the additive.

Comparative Embodiment 18

Eighty (80) percents by volume of the same tetrafluoroethylene/hexafluoropropylene copolymer powder as used in Embodiment 17 as a fluorocarbon polymer powder and 20% by volume of polytetrafluoroethylene as a binder were mixed to prepare a fluorocarbon polymer coating composition. A coating film from this fluorocarbon polymer coating composition was prepared in the same manner as in Embodiment 2. Table 2-4 shows the composition of the comparative coating film sample V17.

Embodiment 19

Fluorocarbon polymer coating compositions were prepared in the same manner as in Embodiment 4 except that tetrafluoroethylene/hexafluoropropylene copolymer powder as used in Embodiment 17 was used as the fluorocarbon polymer powder. Coating films were prepared from these coating compositions in the same manner as in Embodiment 2. Table 2-4 shows the compositions of sample films G-3, H-3 and I-3 with varied amounts of acrylic silicone resin as the binder and perfluorinated polyether as the additive.

Comparative Embodiment 19

Eighty (80) percents by volume of the same tetrafluoroethylene/hexafluoropropylene copolymer powder as used in Embodiment 17 as a fluorocarbon polymer powder and 20% by volume of acrylic silicone resin as a binder were mixed to prepare a fluorocarbon polymer coating composition. A coating film from this fluorocarbon polymer coating composition was prepared in the same manner as in Embodiment 2. Table 2-4 shows the composition of the comparative coating film sample V18.

Embodiment 20

Fluorocarbon polymer coating compositions were prepared in the same manner as in Embodiment 5 except that tetrafluoroethylene/hexafluoropropylene copolymer powder as used in Embodiment 17 was used as the fluorocarbon polymer powder. Coating films were prepared from these coating compositions in the same manner as in Embodiment 2. Table 2-4 shows the compositions of sample films J-3, K-3 and L-3 with varied amounts of polyester resin as the binder and perfluorinated polyether as the additive.

Comparative Embodiment 20

Eighty (80) percents by volume of the same tetrafluoroethylene/hexafluoropropylene copolymer powder as used in Embodiment 17 as a fluorocarbon polymer powder and 20% by volume of polyester resin as a binder were mixed to prepare a fluorocarbon polymer coating composition. A coating film from this fluorocarbon polymer coating composition was prepared in the same manner as in Embodiment 2. Table 2-4 shows the composition of the comparative coating film sample V19.

Embodiment 21

Fluorocarbon polymer coating compositions were prepared in the same manner as in Embodiment 6 except that tetrafluoroethylene/hexafluoropropylene copolymer powder as used in Embodiment 17 was used as the fluorocarbon polymer powder. Coating films were prepared from these coating compositions in the same manner as in Embodiment 2. Table 2-4 shows the compositions of sample films M, N and O wish varied amounts of epoxy resin as the binder and perfluorinated polyether as the additive.

Comparative Embodiment 21

Eighty (80) percents by volume of the same tetrafluoroethylene/hexafluoropropylene copolymer powder as used in Embodiment 17 was used as the fluorocarbon polymer powder and 20% by volume of epoxy resin as a binder were mixed to prepare a fluorocarbon polymer coating composition. A coating film from this fluorocarbon polymer coating composition was prepared in the same manner as in Embodiment 2. Table 2-4 shows the composition of the comparative coating film sample V20.

Embodiment 22

Fluorocarbon polymer coating compositions were prepared in the same manner as in Embodiment 7 except that tetrafluoroethylene/hexafluoropropylene copolymer powder as used in Embodiment 17 was used as the fluorocarbon polymer powder. Coating films were prepared from these coating compositions in the same manner as in Embodiment 2. Table 2-5 shows the compositions of sample films A-4, B-4 and C-4 with varied amounts of polyvinylidene fluoride as the binder and perfluorinated alkyl polyether as the additive.

Comparative Embodiment 22

Eighty (80) percents by volume of the same tetrafluoroethylene/hexafluoropropylene powder as used in Embodiment 17 was used as a fluorocarbon polymer powder and 20% by volume of polyvinylidene fluoride as a binder were mixed to prepare a fluorocarbon polymer coating composition. A coating film from this fluorocarbon polymer coating composition was prepared in the same manner as in Embodiment 2. Table 2-5 shows the composition of the comparative coating film sample V21.

Embodiment 23

Fluorocarbon polymer coating compositions were prepared in the same manner as in Embodiment 8 except that tetrafluoroethylene/hexafluoropropylene copolymer powder as used in Embodiment 17 was used as the fluorocarbon polymer powder. Coating films were prepared from these coating compositions in the same manner as in Embodiment 2. Table 2-5 shows the compositions of sample films D-4, E-4 and F-4 with varied amounts of polytetrafluoroethylene as the binder and perfluorinated alkyl polyether as the additive.

Comparative Embodiment 23

Eighty (80) percents by volume of the same tetrafluoroethylene/hexafluoropropylene powder as used in Embodiment 17 as a fluorocarbon polymer powder and 20% by volume of polytetrafluoroethylene as a binder were mixed to prepare a fluorocarbon polymer coating composition. A coating film from this fluorocarbon polymer coating composition was prepared in the same manner as in Embodiment 2. Table 2-5 shows the composition of the comparative coating film sample V22.

Embodiment 24

Fluorocarbon polymer coating compositions were prepared in the same manner as in Embodiment 9 except that tetrafluoroethylene/hexafluoropropylene copolymer powder as used in Embodiment 17 was used as the fluorocarbon polymer powder. Coating films were prepared from these coating compositions in the same manner as in Embodiment 2. Table 2-5 shows the compositions of sample films G-4, H-4 and I-4 with varied amounts of acrylic silicone resin as the binder and perfluorinated alkyl polyether as the additive.

Comparative Embodiment 24

Eighty (80) percents by volume of the same tetrafluoroethylene/hexafluoropropylene copolymer powder as used in Embodiment 17 as a fluorocarbon polymer powder and 20% by volume of acrylic silicone resin as a binder were mixed to prepare a fluorocarbon polymer coating composition. A coating film from this fluorocarbon polymer coating composition was prepared in the same manner as in Embodiment 2. Table 2-5 shows the composition of the comparative coating film sample V23.

Embodiment 25

Fluorocarbon polymer coating compositions were prepared in the same manner as in Embodiment 10 except that tetrafluoroethylene/hexafluoropropylene copolymer powder as used in Embodiment 17 was used as the polymer powder. Coating films were prepared from these coating compositions in the same manner as in Embodiment 2. Table 2-5 shows the compositions of sample films J-4, K-4 and L-4 with varied amounts of polyester resin as the binder and perfluorinated alkyl polyether as the additive.

Comparative Embodiment 25

Eighty (80) percents by volume of the same tetrafluoroethylene/hexafluoropropylene copolymer powder as used in Embodiment 17 as a fluorocarbon polymer powder and 20% by volume of polyester resin as a binder were mixed to prepare a fluorocarbon polymer coating composition. A coating film from this fluorocarbon polymer coating composition was prepared in the same manner as in Embodiment 2. Table 2-5 shows the composition of the comparative coating film sample V24.

Embodiment 26

Fluorocarbon polymer coating compositions were prepared in the same manner as in Embodiment 11 except that tetrafluoroethylene/hexafluoropropylene copolymer powder as used in Embodiment 17 was used as the fluorocarbon polymer powder. Coating films were prepared from these coating compositions in the same manner as in Embodiment 2. Table 2-5 shows the compositions of sample films M-4, N-4 and O-4 with varied amounts of epoxy resin as the binder and perfluorinated alkyl polyether as the additive.

Comparative Embodiment 26

Eighty (80) percents by volume of the same tetrafluoroethylene/hexafluoropropylene copolymer powder as used in Embodiment 17 as a fluorocarbon polymer powder and 20% by volume of epoxy resin as a binder were mixed to prepare a fluorocarbon polymer coating composition. A coating film from this fluorocarbon polymer coating composition was prepared in the same manner as in Embodiment 2. Table 2-5 shows the composition of the comparative coating film sample V25.

Embodiment 27

Fluorocarbon polymer coating compositions were prepared in the same manner as in Embodiment 2 except that tetrafluoroethylene/hexafluoropropylene copolymer powder as used in Embodiment 17 was used as the fluorocarbon polymer powder. Coating films were prepared from these coating compositions in the same manner as in Embodiment 2. Table 2-6 shows the compositions of sample films A-5, B-5 and C-5 with varied amounts of polyvinylidene fluoride as the binder and polytrifluoroethylene as the additive.

Comparative Embodiment 27

Eighty (80) percents by volume of the same tetrafluoroethylene/hexafluoropropylene copolymer powder as used in Embodiment 17 as a fluorocarbon polymer powder and 20% by volume of polyvinylidene fluoride as a binder were mixed to prepare a fluorocarbon polymer coating composition. A coating film from this fluorocarbon polymer coating composition was prepared in the same manner as in Embodiment 2. Table 2-6 shows the composition of the comparative coating film sample V26.

Embodiment 28

Fluorocarbon polymer coating compositions were prepared in the same manner as in Embodiment 13 except that tetrafluoroethylene/hexafluoropropylene copolymer powder as used in Embodiment 17 was used as the fluorocarbon polymer powder. Coating films were prepared from these coating compositions in the same manner as in Embodiment 2. Table 2-6 shows the compositions of sample films D-5, E-5 and F-5 with varied amounts of polytetrafluoroethylene as the binder and polytrifluoroethylene as the additive.

Comparative Embodiment 28

Eighty (80) percents by volume of the same tetrafluoroethylene/hexafluoropropylene copolymer powder as used in Embodiment 17 as a fluorocarbon polymer powder and 20% by volume of polytetrafluoroethylene as a binder were mixed to prepare a fluorocarbon polymer coating composition. A coating film from this fluorocarbon polymer coating composition was prepared in the same manner as in Embodiment 2. Table 2-6 shows the composition of the comparative coating film sample V27.

Embodiment 29

Fluorocarbon polymer coating compositions were prepared in the same manner as in Embodiment 14 except that tetrafluoroethylene/hexafluoropropylene copolymer powder as used in Embodiment 17 was used as the fluorocarbon polymer powder. Coating films were prepared from these coating compositions in the same manner as in Embodiment 2. Table 2-6 shows the compositions of sample films G-5, H-5 and I-5 with varied amounts of acrylic silicone resin as the binder and polytrifluoroethylene as the additive.

Comparative Embodiment 29

Eighty (80) percents by volume of the same tetrafluoroethylene/hexafluoropropylene copolymer powder as used in Embodiment 17 as a fluorocarbon polymer powder and 20% by volume of acrylic silicone resin as a binder were mixed to prepare a fluorocarbon polymer coating composition. A coating film from this fluorocarbon polymer coating composition was prepared in the same manner as in Embodiment 2. Table 2-6 shows the composition of the comparative coating film sample V28.

Embodiment 30

Fluorocarbon polymer coating compositions were prepared in the same manner as in Embodiment 15 except that tetrafluoroethylene/hexafluoropropylene copolymer powder as used in Embodiment 17 was used as the fluorocarbon polymer powder. Coating films were prepared from these coating compositions in the same manner as in Embodiment 2. Table 2-6 shows the compositions of sample films J-5, K-5 and L-5 with varied amounts of polyester resin as the binder and polytrifluoroethylene as the additive.

Comparative Embodiment 30

Eighty (80) percents by volume of the same tetrafluoroethylene/hexafluoropropylene copolymer powder as used in Embodiment 17 as a fluorocarbon polymer powder and 20% by volume of polyester resin as used in Embodiment 5 as a binder were mixed to prepare a fluorocarbon polymer coating composition. A coating film from this fluorocarbon polymer coating composition was prepared in the same manner as in Embodiment 2. Table 2-6 shows the composition of the comparative coating film sample V29.

Embodiment 31

Fluorocarbon polymer coating compositions were prepared in the same manner as in Embodiment 16 except that tetrafluoroethylene/hexafluoropropylene copolymer powder as used in Embodiment 17 was used as the fluorocarbon polymer powder. Coating films were prepared from these coating compositions in the same manner as in Embodiment 2. Table 2-6 shows the compositions of sample films M-5, N-5 and O-5 with varied amounts of epoxy resin as the binder and polytrifluoroethylene as the additive.

Comparative Embodiment 31

Eighty (80) percents by volume of the same tetrafluoroethylene/hexafluoropropylene ccpolymer powder as used in Embodiment 17 as a fluorocarbon polymer powder and 20% by volume of epoxy resin as used in Embodiment 6 as a binder were mixed to prepare a fluorocarbon polymer coating composition. A coating film from this fluorocarbon polymer coating composition was prepared in the same manner as in Embodiment 2. Table 2-6 shows the composition of the comparative coating film sample V30.

In Tables 2-1 to 2-6 below, the following abbreviations were used.

| Abbreviation | Name of Compound |
|---|---|
| 4FE | Polytetrafluoroethylene |
| 4FE/6FP | Tetrafluoroethylene/hexafluoropropylene copolymer |
| FV | Polyvinylidene fluoride |
| AS | Acrylic silicone resin |
| PE | Polyester resin |
| EP | Epoxy resin |
| PFPE | Perfluorinated polyether |
| PFAPE | Perfluorinated alkyl polyether |
| 3FE | Polytrifluoroethylene |

TABLE 2-1

| | | FLUOROCARBON POLYMER POWDER (VOL. %) | | BINDER (VOL. %) | | | | | ADDITIVE (VOL. %) |
|---|---|---|---|---|---|---|---|---|---|
| | SAMPLE | 4FE | 4FE/6FP | FV | 4FE | AS | PE | EP | PFPE |
| EXAMPLE 2 | A | 80 | — | 19.5 | — | — | — | — | 0.5 |
| | B | 80 | — | 18.5 | — | — | — | — | 2.0 |
| | C | 80 | — | 15.0 | — | — | — | — | 5.0 |
| COM. EX. 2 | V1 | 80 | — | 20 | — | — | — | — | — |
| EXAMPLE 3 | D | 80 | — | — | 19.5 | — | — | — | 0.5 |
| | E | 80 | — | — | 18.5 | — | — | — | 2.0 |
| | F | 80 | — | — | 15.0 | — | — | — | 5.0 |
| COM. EX. 3 | V2 | 80 | — | — | 20 | — | — | — | — |
| EXAMPLE 4 | G | 80 | — | — | — | 19.5 | — | — | 0.5 |
| | H | 80 | — | — | — | 18.5 | — | — | 2.0 |
| | I | 80 | — | — | — | 15.0 | — | — | 5.0 |
| COM. EX. 4 | V3 | 80 | — | — | — | 20 | — | — | — |
| EXAMPLE 5 | J | 80 | — | — | — | — | 19.5 | — | 0.5 |
| | K | 80 | — | — | — | — | 18.5 | — | 2.0 |
| | L | 80 | — | — | — | — | 15.0 | — | 5.0 |
| COM. EX. 5 | V4 | 80 | — | — | — | — | 20 | — | — |
| EXAMPLE 6 | M | 80 | — | — | — | — | — | 19.5 | 0.5 |
| | N | 80 | — | — | — | — | — | 18.5 | 2.0 |
| | O | 80 | — | — | — | — | — | 15.0 | 5.0 |
| COM. EX. 6 | V5 | 80 | — | — | — | — | — | 20 | — |

TABLE 2-2

| | | FLUOROCARBON POLYMER POWDER (VOL. %) | | BINDER (VOL. %) | | | | | ADDITIVE (VOL. %) |
|---|---|---|---|---|---|---|---|---|---|
| | SAMPLE | 4FE | 4FE/6FP | FV | 4FE | AS | PE | EP | PFAPE |
| EXAMPLE 7 | A-1 | 80 | — | 19.5 | — | — | — | — | 0.5 |
| | B-1 | 80 | — | 18.5 | — | — | — | — | 2.0 |
| | C-1 | 80 | — | 15.0 | — | — | — | — | 5.0 |
| COM. EX. 7 | V6 | 80 | — | 20 | — | — | — | — | — |
| EXAMPLE 8 | D-1 | 80 | — | — | 19.5 | — | — | — | 0.5 |
| | E-1 | 80 | — | — | 18.5 | — | — | — | 2.0 |
| | F-1 | 80 | — | — | 15.0 | — | — | — | 5.0 |
| COM. EX. 8 | V7 | 80 | — | — | 20 | — | — | — | — |
| EXAMPLE 9 | G-1 | 80 | — | — | — | 19.5 | — | — | 0.5 |
| | H-1 | 80 | — | — | — | 18.5 | — | — | 2.0 |
| | I-1 | 80 | — | — | — | 15.0 | — | — | 5.0 |
| COM. EX. 9 | V8 | 80 | — | — | — | 20 | — | — | — |
| EXAMPLE 10 | J-1 | 80 | — | — | — | — | 19.5 | — | 0.5 |
| | K-1 | 80 | — | — | — | — | 18.5 | — | 2.0 |
| | L-1 | 80 | — | — | — | — | 15.0 | — | 5.0 |
| COM. EX. 10 | V9 | 80 | — | — | — | — | 20 | — | — |
| EXAMPLE 11 | M-1 | 80 | — | — | — | — | — | 19.5 | 0.5 |
| | N-1 | 80 | — | — | — | — | — | 18.5 | 2.0 |
| | O-1 | 80 | — | — | — | — | — | 15.0 | 5.0 |
| COM. EX. 11 | V10 | 80 | — | — | — | — | — | 20 | — |

TABLE 2-3

| | | FLUOROCARBON POLYMER POWDER (VOL. %) | | BINDER (VOL. %) | | | | | ADDITIVE (VOL. %) |
|---|---|---|---|---|---|---|---|---|---|
| | SAMPLE | 4FE | 4FE/6FP | FV | 4FE | AS | PE | EP | 3F3 |
| EXAMPLE 12 | A-2 | 80 | — | 19.5 | — | — | — | — | 0.5 |
| | B-2 | 80 | — | 18.5 | — | — | — | — | 2.0 |
| | C-2 | 80 | — | 15.0 | — | — | — | — | 5.0 |
| COM. EX. 12 | V11 | 80 | — | 20 | — | — | — | — | — |
| EXAMPLE 13 | D-2 | 80 | — | — | 19.5 | — | — | — | 0.5 |
| | E-2 | 80 | — | — | 18.5 | — | — | — | 2.0 |
| | F-2 | 80 | — | — | 15.0 | — | — | — | 5.0 |
| COM. EX. 13 | V12 | 80 | — | — | 20 | — | — | — | — |
| EXAMPLE 14 | G-1 | 80 | — | — | — | 19.5 | — | — | 0.5 |
| | H-1 | 80 | — | — | — | 18.5 | — | — | 2.0 |
| | I-1 | 80 | — | — | — | 15.0 | — | — | 5.0 |
| COM. EX. 14 | V13 | 80 | — | — | — | 20 | — | — | — |
| EXAMPLE 15 | J-2 | 80 | — | — | — | — | 19.5 | — | 0.5 |
| | K-2 | 80 | — | — | — | — | 18.5 | — | 2.0 |
| | L-2 | 80 | — | — | — | — | 15.0 | — | 5.0 |
| COM. EX. 15 | V14 | 80 | — | — | — | — | 20 | — | — |
| EXAMPLE 16 | M-2 | 80 | — | — | — | — | — | 19.5 | 0.5 |
| | N-2 | 80 | — | — | — | — | — | 18.5 | 2.0 |
| | O-2 | 80 | — | — | — | — | — | 15.0 | 5.0 |
| COM. EX. 16 | V15 | 80 | — | — | — | — | — | 20 | — |

TABLE 2-4

| | | FLUOROCARBON POLYMER POWDER (VOL. %) | | BINDER (VOL. %) | | | | | ADDITIVE (VOL. %) |
|---|---|---|---|---|---|---|---|---|---|
| | SAMPLE | 4FE | 4FE/6FP | FV | 4FE | AS | PE | EP | PFPE |
| EXAMPLE 17 | A-3 | — | 80 | 19.5 | — | — | — | — | 0.5 |
| | B-3 | — | 80 | 18.5 | — | — | — | — | 2.0 |
| | C-3 | — | 80 | 15.0 | — | — | — | — | 5.0 |
| COM. EX. 17 | V16 | — | 80 | 20 | — | — | — | — | — |

TABLE 2-4-continued

| | | FLUOROCARBON POLYMER POWDER (VOL. %) | | BINDER (VOL. %) | | | | | ADDITIVE (VOL. %) |
|---|---|---|---|---|---|---|---|---|---|
| | SAMPLE | 4FE | 4FE/6FP | FV | 4FE | AS | PE | EP | PFPE |
| EXAMPLE 18 | D-3 | — | 80 | — | 19.5 | — | — | — | 0.5 |
| | E-3 | — | 80 | — | 18.5 | — | — | — | 2.0 |
| | F-3 | — | 80 | — | 15.0 | — | — | — | 5.0 |
| COM. EX. 18 | V17 | — | 80 | — | 20 | — | — | — | — |
| EXAMPLE 19 | G-3 | — | 80 | — | — | 19.5 | — | — | 0.5 |
| | H-3 | — | 80 | — | — | 18.5 | — | — | 2.0 |
| | I-3 | — | 80 | — | — | 15.0 | — | — | 5.0 |
| COM. EX. 19 | V18 | — | 80 | — | — | 20 | — | — | — |
| EXAMPLE 20 | J-3 | — | 80 | — | — | — | 19.5 | — | 0.5 |
| | K-3 | — | 80 | — | — | — | 18.5 | — | 2.0 |
| | L-3 | — | 80 | — | — | — | 15.0 | — | 5.0 |
| COM. EX. 20 | V19 | — | 80 | — | — | — | 20 | — | — |
| EXAMPLE 21 | M-3 | — | 80 | — | — | — | — | 19.5 | 0.5 |
| | N-3 | — | 80 | — | — | — | — | 18.5 | 2.0 |
| | O-3 | — | 80 | — | — | — | — | 15.0 | 5.0 |
| COM. EX. 21 | V20 | — | 80 | — | — | — | — | 20 | — |

TABLE 2-5

| | | FLUOROCARBON POLYMER POWDER (VOL. %) | | BINDER (VOL. %) | | | | | ADDITIVE (VOL. %) |
|---|---|---|---|---|---|---|---|---|---|
| | SAMPLE | 4FE | 4FE/6FP | FV | 4FE | AS | PE | EP | PFAPE |
| EXAMPLE 22 | A-4 | — | 80 | 19.5 | — | — | — | — | 0.5 |
| | B-4 | — | 80 | 18.5 | — | — | — | — | 2.0 |
| | C-4 | — | 80 | 15.0 | — | — | — | — | 5.0 |
| COM. EX. 22 | V21 | — | 80 | 20 | — | — | — | — | — |
| EXAMPLE 23 | D-4 | — | 80 | — | 19.5 | — | — | — | 0.5 |
| | E-4 | — | 80 | — | 18.5 | — | — | — | 2.0 |
| | F-4 | — | 80 | — | 15.0 | — | — | — | 5.0 |
| COM. EX. 23 | V22 | — | 80 | — | 20 | — | — | — | — |
| EXAMPLE 24 | G-4 | — | 80 | — | — | 19.5 | — | — | 0.5 |
| | H-4 | — | 80 | — | — | 18.5 | — | — | 2.0 |
| | I-4 | — | 80 | — | — | 15.0 | — | — | 5.0 |
| COM. EX. 24 | V23 | — | 80 | — | — | 20 | — | — | — |
| EXAMPLE 25 | J-4 | — | 80 | — | — | — | 19.5 | — | 0.5 |
| | K-4 | — | 80 | — | — | — | 18.5 | — | 2.0 |
| | L-4 | — | 80 | — | — | — | 15.0 | — | 5.0 |
| COM. EX. 25 | V24 | — | 80 | — | — | — | 20 | — | — |
| EXAMPLE 26 | M-4 | — | 80 | — | — | — | — | 19.5 | 0.5 |
| | N-4 | — | 80 | — | — | — | — | 18.5 | 2.0 |
| | O-4 | — | 80 | — | — | — | — | 15.0 | 5.0 |
| COM. EX. 26 | V25 | — | 80 | — | — | — | — | 20 | — |

TABLE 2-6

| | | FLUOROCARBON POLYMER POWDER (VOL. %) | | BINDER (VOL. %) | | | | | ADDITIVE (VOL. %) |
|---|---|---|---|---|---|---|---|---|---|
| | SAMPLE | 4FE | 4FE/6FP | FV | 4FE | AS | PE | EP | 3FE |
| EXAMPLE 27 | A-5 | — | 80 | 19.5 | — | — | — | — | 0.5 |
| | B-5 | — | 80 | 18.5 | — | — | — | — | 2.0 |
| | C-5 | — | 80 | 15.0 | — | — | — | — | 5.0 |
| COM. EX. 27 | V26 | — | 80 | 20 | — | — | — | — | — |
| EXAMPLE 28 | D-5 | — | 80 | — | 19.5 | — | — | — | 0.5 |
| | E-5 | — | 80 | — | 18.5 | — | — | — | 2.0 |
| | F-5 | .— | 80 | — | 15.0 | — | — | — | 5.0 |
| COM. EX. 28 | V27 | — | 80 | — | 20 | — | — | — | — |

TABLE 2-6-continued

|  | SAMPLE | FLUOROCARBON POLYMER POWDER (VOL. %) | | BINDER (VOL. %) | | | | | ADDITIVE (VOL. %) |
|---|---|---|---|---|---|---|---|---|---|
|  |  | 4FE | 4FE/6FP | FV | 4FE | AS | PE | EP | 3FE |
| EXAMPLE 29 | G-5 | — | 80 | — | — | 19.5 | — | — | 0.5 |
|  | H-5 | — | 80 | — | — | 18.5 | — | — | 2.0 |
|  | I-5 | — | 80 | — | — | 15.0 | — | — | 5.0 |
| COM. EX. 29 | V28 | — | 80 | — | — | 20 | — | — | — |
| EXAMPLE 30 | J-5 | — | 80 | — | — | — | 19.5 | — | 0.5 |
|  | K-5 | — | 80 | — | — | — | 18.5 | — | 2.0 |
|  | L-5 | — | 80 | — | — | — | 15.0 | — | 5.0 |
| COM. EX. 30 | V29 | — | 80 | — | — | — | 20 | — | — |
| EXAMPLE 31 | M-5 | — | 80 | — | — | — | — | 19.5 | 0.5 |
|  | N-5 | — | 80 | — | — | — | — | 18.5 | 2.0 |
|  | O-5 | — | 80 | — | — | — | — | 15.0 | 5.0 |
| COM. EX. 31 | V30 | — | 80 | — | — | — | — | 20 | — |

TEST EXAMPLE 4

In the same manner as in TEST EXAMPLE 1 were measured the water repellent properties of the coating film samples of Embodiments 2 to 6 and Comparative Embodiments 2 to 6. As a result, all the coating film samples A to O of Embodiments 2 to 6 and coating film samples V1 to V5 of Comparative Embodiments 2 to 6 showed a water contact angle of about 150°. Therefore, no substantial difference was observed in initial water repellent properties between the samples of Embodiments 2 to 6 and the comparative samples of Comparative Embodiments 2 to 6.

Next, deterioration with time of water repellent properties of coating films will be described hereinbelow. The coating films samples A to O of Embodiments 2 to 6 and comparative film samples V1 to V5 of Comparative Embodiments 2 to 6 were immersed in deionized water and taken out of the water after predetermined period (days), followed by measuring water contact angles in the same manner as described in above. This operation was repeated and influences of long-term water immersion were evaluated. FIGS. 5A, 5B, 5C, 5D and 5E show the results obtained. In FIGS. 5A, 5B, 5C, 5D and 5E, blank circle, blank square, blank triangle indicate samples containing the additive in amounts of 0.5% by volume, 2.0% by volume, and 5.0% by volume, respectively. Filled triangle indicates the sample which contain 0% by volume of the additive. The fluorocarbon polymer coating films of Embodiments 2 to 6 show a less decrease in water repellent properties with time than the coating films of Comparative Embodiments 2 to 6. Upon measurement of water contact angle, the coating films of Embodiments 2 to 6 showed a water contact angle of 150° just after formation of the films. Therefore, comparing initial water repellent properties, there was observed no substantial difference between the samples of the present invention and those of Comparative Embodiments. However, as for long-term resistance to water immersion, the fluorocarbon polymer coating composition is superior to the conventional fluorocarbon polymer coating composition.

Further, similar water repellency tests were conducted on samples A-1 to O-1, A-2 to O-2, A-3 to O-3, A-4 to O-4, and A-5 to O-5 of Embodiments 7 to 31 as well as samples V6 to V30 of Comparative Embodiments 7 to 31 in the same manner as in TEST EXAMPLE 1. Results similar to those obtained with the samples of Embodiments 2 to 6 and Comparative Embodiments 2 to 6 were obtained.

Figure 6:
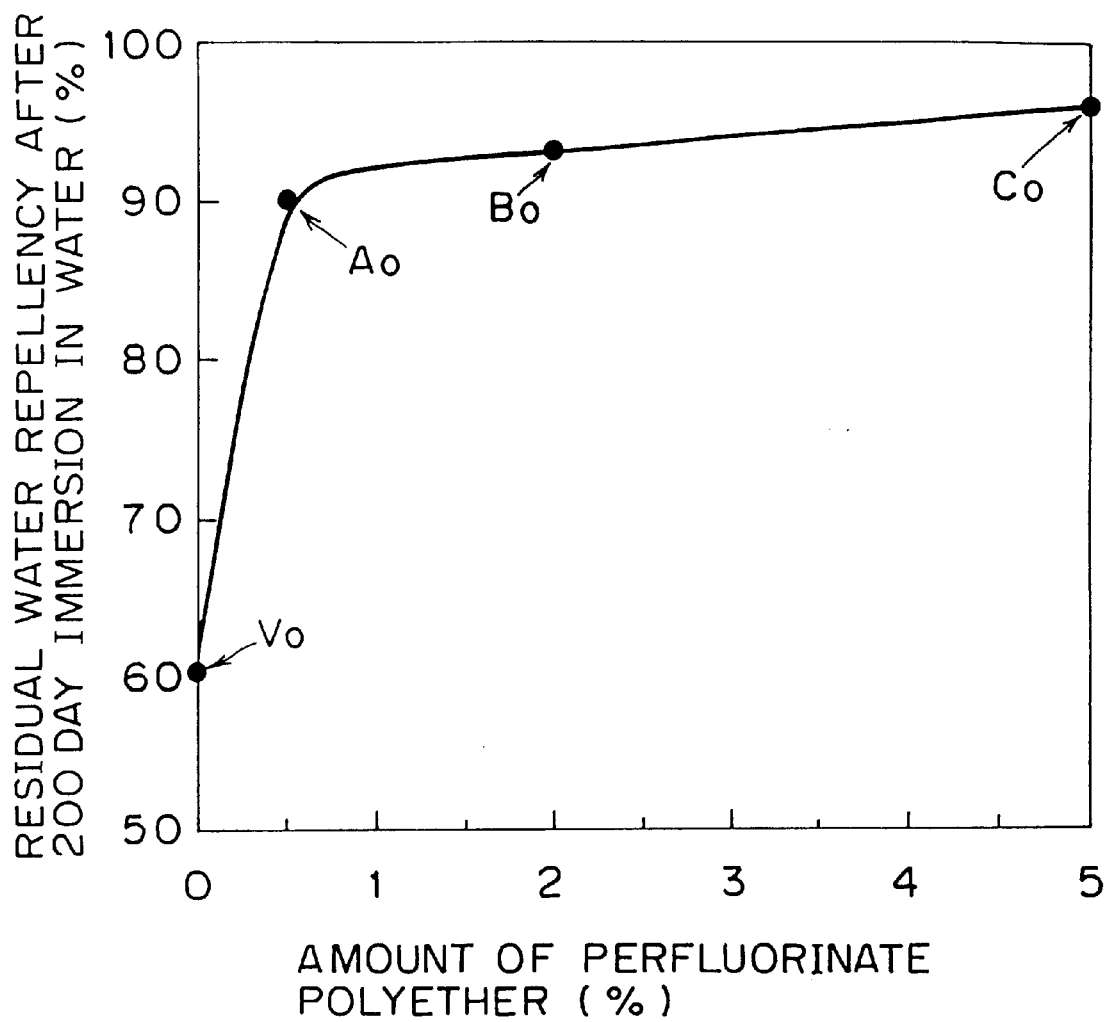
FIG. 6 is a graph illustrating an influence of fluoro oil content on residual water repellent properties after 200 day immersion in water.

FIG. 6 illustrates influence of the amount of the perfluorinated polyether on residual water repellent properties after 200 day water immersion, as an index of long-term durability to water. In FIG. 6, symbols $A_0$, $B_0$ and $C_0$ indicate the film sample groups containing 0.5% by volume, 2.0% by volume and 5.0%, respectively, by volume of perfluorinated polyether as the additive. $V_0$ indicates the film sample group containing no additive.

Residual water repellency is defined by the following equation:

$$\text{Residual Water Repellency} = \frac{\text{Water Contact Angle After 200 Day Water Immersion}}{\text{Initial Water Contact Angle}}$$

and calculated from FIGS. 5A, 5B, 5C, 5D and 5E. FIG. 6 shows that when 0.5% by volume of perfluorinated polyether is present in the coating film (cf. sample group $A_0$), the residual water repellent property after 200 day water immersion is at least 90%, which means long-term durability to water.

TEST EXAMPLE 5

Figure 7A:
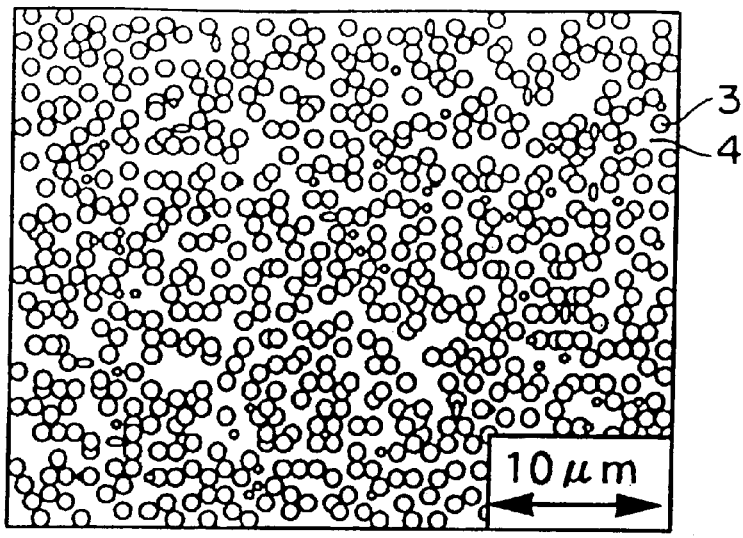
FIG. 7A is a schematic diagram illustrating a surface of a fluorocarbon polymer-containing coating film containing a varied amount of fluoro oil (magnification: X300)
Figure 7B:
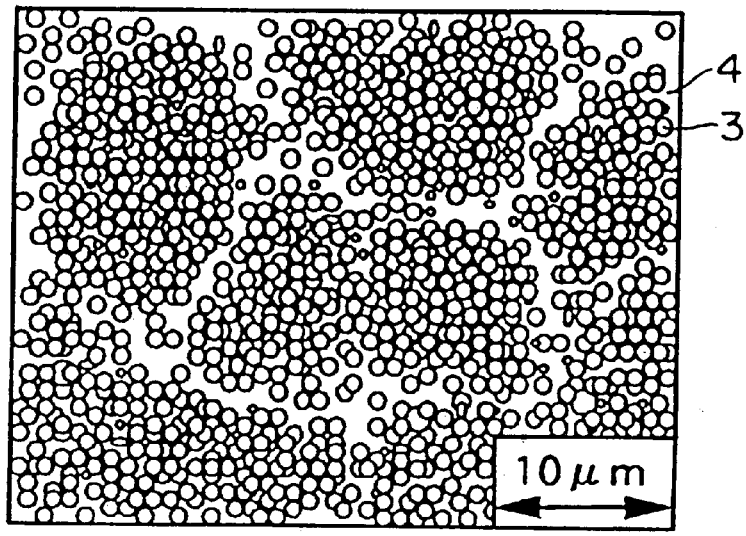
FIG. 7B is a schematic diagram illustrating a surface of a fluorocarbon polymer-containing coating film containing a varied amount of fluoro oil (magnification: X300)
Figure 7C:
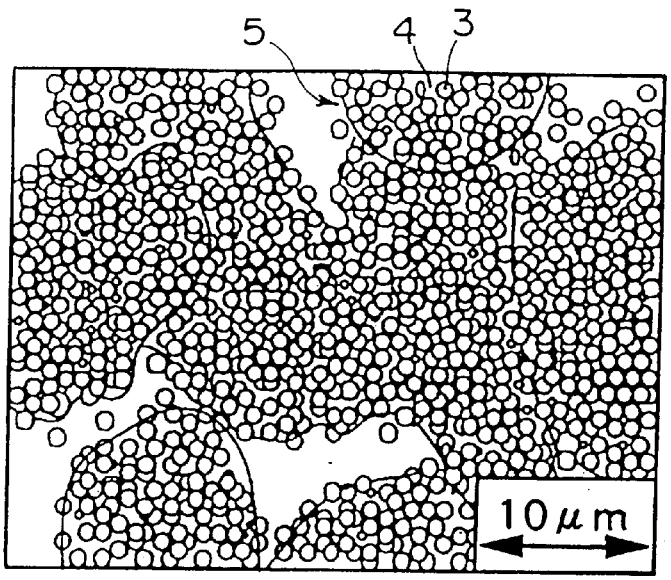
FIG. 7C is a schematic diagram illustrating a surface of a fluorocarbon polymer-containing coating film containing a varied amount of fluoro oil (magnification: X300)
Figure 7D:
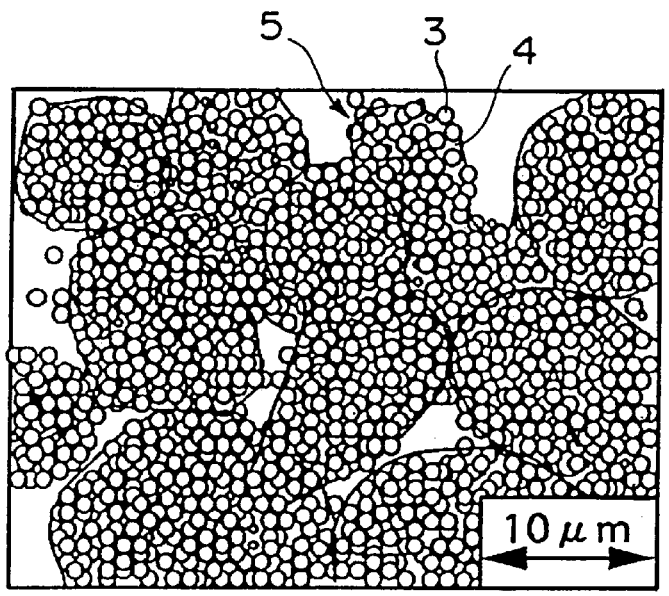
FIG. 7D is a schematic diagram illustrating a surface of a fluorocarbon polymer-containing coating film containing a varied amount of fluoro oil (magnification: X300)
Figure 8A:
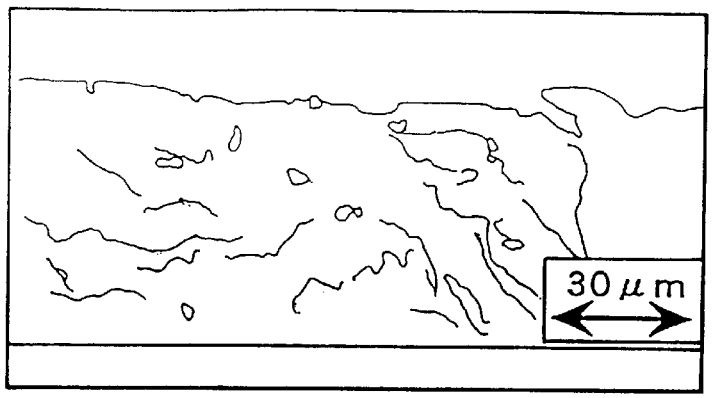
FIG. 8A is a schematic diagram illustrating a surface of a fluorocarbon polymer-containing coating film with a varied amount of fluoro oil (magnification: X1,000)
Figure 8B:
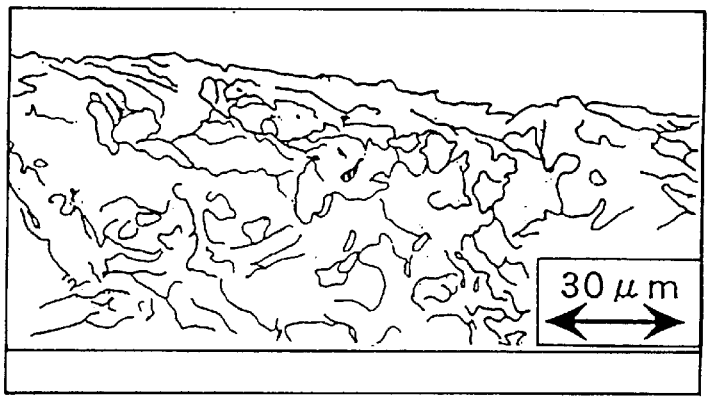
FIG. 8B is a schematic diagram illustrating a surface of a fluorocarbon polymer-containing coating film with a varied amount of fluoro oil (magnification: X1,000)
Figure 8C:
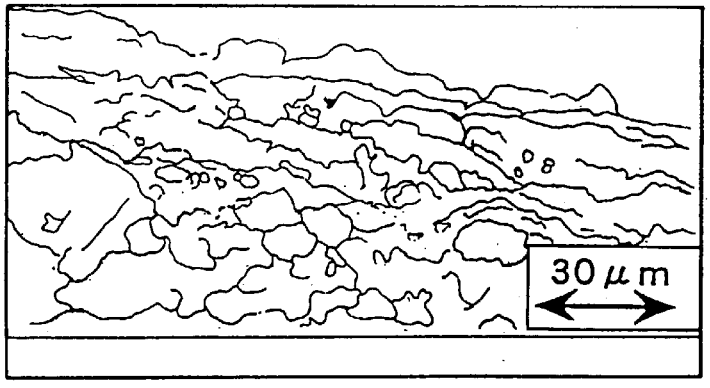
FIG. 8C is a schematic diagram illustrating a surface of a fluorocarbon polymer-containing coating film with a varied amount of fluoro oil (magnification: X1,000)
Figure 8D:
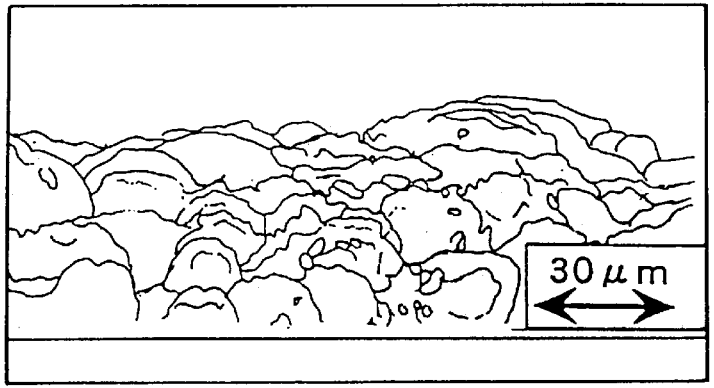
FIG. 8D is a schematic diagram illustrating a surface of a fluorocarbon polymer-containing coating film with a varied amount of fluoro oil (magnification: X1,000)
Figure 9A:
FIG. 9A is a graph illustrating a profile of a fluorocarbon polymer-containing coating film containing a varied amount of fluoro oil.
Figure 9B:
FIG. 9B is a graph illustrating a profile of a fluorocarbon polymer-containing coating film containing a varied amount of fluoro oil.
Figure 9C:
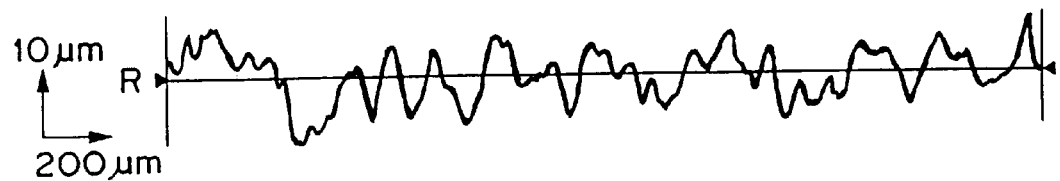
FIG. 9C is a graph illustrating a profile of a fluorocarbon polymer-containing coating film containing a varied amount of fluoro oil.
Figure 9D:
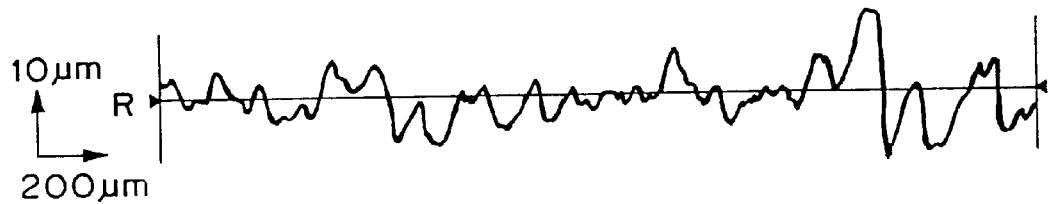
FIG. 9D is a graph illustrating a profile of a fluorocarbon polymer-containing coating film containing a varied amount of fluoro oil.

Next, in order to examine correlation of the structure of the coating films with time-dependent change of water repellency, the surfaces of the coating films of samples A to C of Embodiment 2 and sample V1 of Comparative Embodiment 2 were observed. FIGS. 7A, 7B, 7C and 7D are schematic diagrams illustrating the conditions of the surfaces of the coating films observed on SEM (scanning electron microscope) at a magnification of X3,000. In FIGS. 7A, 7B, 7C and 7D, 3 is a fluorocarbon polymer particle, 4 is a binder, and 5 is an agglomerate. As shown in FIGS. 7B, 7C and 7D schematically illustrating the surface of the film samples A to C, addition of perfluorinated polyether cause the fluorocarbon polymer particles 3 to be taken up by the binder (or fluoro oil as the additive) 4 and agglomerate to form a fluorocarbon polymer coating composition containing fluorocarbon polymer powder consisting of particles with gaps therebetween being filled with the binder or fluoro oil. This phenomenon is remarkable in samples B and C. The surface of the agglomerate 5 is covered with the fluorocarbon polymer particles 3. The above-described results suggest that this particular structure of the coating film as observed in the samples of Embodiment 2 contribute to long-term durability to water.

To further examine whether the configuration of the surface of the coating film as illustrated in FIGS. 7A, 7B, 7C or 7D is also retained inside the coating film, cross-section of the coating film was observed on SEM. FIGS. 8A, 8B, 8C and 8D are schematic diagrams illustrating the profile of the film samples A to C of Embodiment 2 and sample V1 of Comparative Embodiment 2 observed on SEM at a magnification of X1,000. The FRP plate was notched and applied shearing force to cut. The resulting cross section was used as a sample for observing the profile of the coating film. In the sample of Comparative Embodiment 2, no agglomeration of the fluorocarbon polymer powder was observed from the surface to the inside of the coating film. On the other hand, addition of perfluorinated polyether resulted in the agglomeration of the fluorocarbon polymer powder. Particularly in the sample C, remarkable agglomeration can be observed which prevails from the surface to just above the FRP, substrate. In the samples A and B where no remarkable agglomeration was observed, breakage occurred between the fluorocarbon polymer particles, which indicates that the binder or fluoro oil (additive) fills the gaps between the particles. For quantifying the conditions of agglomeration of the fluorocarbon polymer powder as observed by the above-described surface and profile observations, measurement was made of surface roughness of the film samples A to C of Embodiment 2 and sample V1 of Comparative Embodiment 2. Surface roughness was measured using a surface roughness tester manufactured by TOKYO SEIMITSU CO., LTD. by the method according to JIS B 0601 (Japan Standard Association; JIS HANDBOOK 34, Metal Surface Treatment, Item 17 (1994). FIGS. 9A, 9B, 9C and 9D show surface roughness curves and scales in 2-dimensional measurement for the respective samples. Table 3 shows ten-point average surface roughness values (JIS B 0601).

TABLE 3

| Sample | | Ten Point Average Surface Roughness ($\mu$m) |
|---|---|---|
| Example | A | 7.1 |
| | B | 17.4 |
| | C | 19.5 |
| Comparative Example | | 2.8 |

From the results shown above, increasing amounts of perfluorinated polyether results in increased surface roughness values. This increase in surface roughness, as illustrated in FIGS. 7B, 7C and 7D and FIGS. 8B, 8C and 8D, is considered to correspond to the phenomenon that the fluorocarbon polymer powder is being incorporated in the additive or binder to agglomerate.

From the above-described results, the coating films of the present invention that contains an additive in addition to the fluorocarbon polymer powder and the binder has a specific structure that the fluorocarbon polymer particles agglomerate to form agglomerated units to fill the gaps between the fluorocarbon polymer particles so that a decrease in water repellency after prolonged immersion in water can be prevented effectively.

Embodiment 32

Polytetrafluoroethylene powder (M.W.: 8,500, average particle diameter: 1 $\mu$m) was prepared under atmosphere of not higher than 0.1% oxygen with an increased degree of fluorination. The thus prepared fluorocarbon polymer powder (H) floated on the surface of 5% acetone water. The fluorocarbon polymer powder (H), polyvinylidene fluoride as a binder and perfluorinated polyether (M.W.: 2,700) as an additive were mixed in a ball mill to prepare coating compositions. These coating compositions were sprayed onto respective FRP plates comprised mainly by an epoxy resin to form coating films for evaluation of the effect of the present invention. Table 4 shows the compositions of samples A-6 to C-6 in which the content (volume percentage) of the polyvinylidene fluoride as a binder and perfluorinated polyether as an additive were varied.

Furthermore, another type of polytetrafluoroethylene powder (M.W.: 8,500, average particle diameter 1 $\mu$m) was prepared without controlling increasing the degree of fluorination and controlling the concentration of oxygen in the ambient atmosphere. The thus obtained fluorocarbon polymer powder (L) settled to the bottom in 5% acetone water. The coating compositions were prepared in the same manner as described above except that use was made of the fluorocarbon polymer powder (L). The resulting coating compositions were sprayed onto respective FRP plates comprised mainly by an epoxy resin to form coating films. Table 4 shows the compositions of samples A-7, B-7 and C-7 in which the content (volume percentage) of the polyvinylidene fluoride as a binder and perfluorinated polyether as an additive were varied.

Comparative Embodiment 32

A coating film sample was prepared in the same manner as in Embodiment 32 except that no additive was used. Table 4 shows the composition of the comparative coating film sample V31 and V32.

TABLE 4

| | SAMPLE | FLUOROCARBON POLYMER POWDER (VOL. %) | | BINDER (VOL. %) | | | | ADDITIVE (VOL. %) |
|---|---|---|---|---|---|---|---|---|
| | | 4FE(H) | 4FE(L) | FV | 4FE | AS | PE | EP | PFPE |
| EXAMPLE 32 | A-6 | 80 | — | 19.5 | — | — | — | — | 0.5 |
| | B-6 | 80 | — | 18.5 | — | — | — | — | 2.0 |
| | C-6 | 80 | — | 15.0 | — | — | — | — | 5.0 |
| | A-7 | — | 80 | 19.5 | — | — | — | — | 0.5 |
| | B-7 | — | 80 | 18.5 | — | — | — | — | 2.0 |
| | C-7 | — | 80 | 15.0 | — | — | — | — | 5.0 |
| COM. EX. 32 | V31 | 80 | — | 20 | — | — | — | — | — |
| | V32 | — | 80 | 20 | — | — | — | — | — |

TEST EXAMPLE 6

Figure 10A:
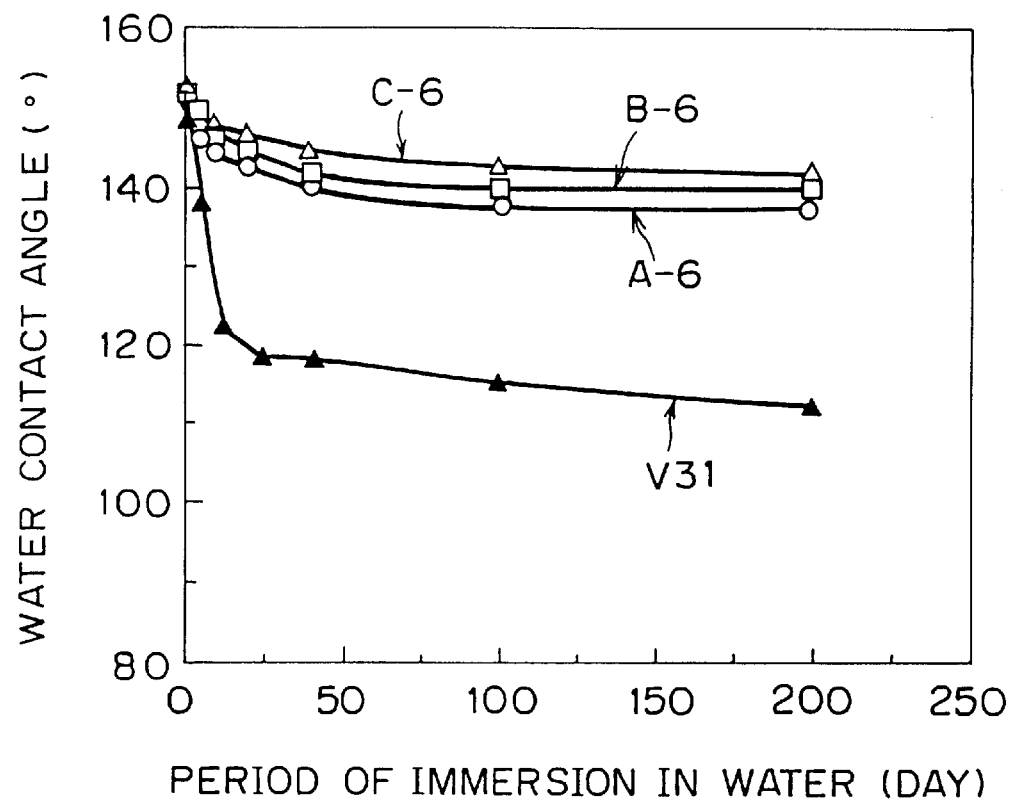
FIG. 10A is a graph illustrating an influence of a manufacturing method for manufacturing fluorocarbon polymer powder in an oxygen-controlled environment on water repellent properties of a coating film containing the powder.
Figure 10B:
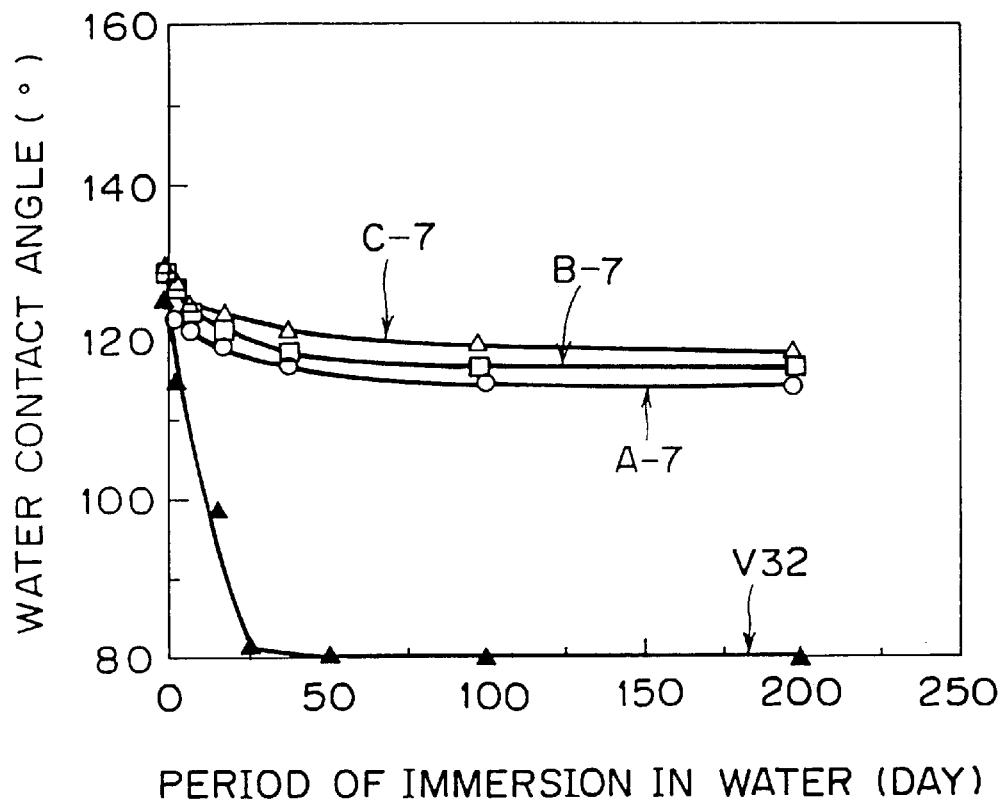
FIG. 10B is a graph illustrating an influence of a manufacturing method for manufacturing fluorocarbon polymer powder in an environment without oxygen control on water repellent properties of a coating film containing the polymer powder.

Next, deterioration with time of water repellency of samples of Embodiment 32 and Comparative Embodiment 32 were examined. The coating film samples of Embodiment 32, i.e. A-6, B-6, C-6, A-7, B-7 and C-7 and samples of Comparative Embodiment 32, i.e., V31 and V32, were immersed in deionized water and taken out therefrom after predetermined period (days) and water contact angles were measured in the same manner as described above. This operation was repeated and the results obtained were evaluated for influence of long term water immersion on the water repellent properties of the films. FIGS. 10A and 10B show the results. In FIGS. 10A and 10B, blank circle, blank square and blank triangle indicate the samples which contained 0.5% by volume, 2.0% by volume and 5.0% by volume, respectively, of the additive. Filled triangle indicates samples containing no additive (0% by volume). From the results, it can be seen that the fluorocarbon polymer powder (H), which was prepared with an increased degree of fluorination and under atmosphere of not higher than 0.1% of oxygen, showed substantially the same tendency of resistance to deterioration with time of water repellency as the fluorocarbon polymer powder (L), which was prepared without increasing the degree of fluorination and controlling oxygen concentration in the ambient atmosphere while the powder (H) showed an initial water contact angle of about 150° in contrast to the powder (L) which showed an initial water contact angle of about 130°. Therefore, use of the powder (H) is effective in increasing the initial water repellency of the coating films.

The present invention has been described in detail with respect to an embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A coating composition having a water contact angle of at least 150° and having prolonged water repellent properties, consisting essentially of:

from 80 to 90% by volume of a fluorocarbon polymer powder comprised of a fluorocarbon polymer which has an average molecular weight ranging from 500 to 20,000, which has substantially completely fluorinated terminal groups and is prepared in an atmosphere having an oxygen concentration not higher than 0.1% so that groups in the polymer chain capable of forming hydrogen bonds with molecules of water are minimized, and which is selected from the group consisting of polytetrafluoroethylene, tetrafluoroethylene/ hexafluoropropylene coploymer, polyvinylidene fluoride and mixtures thereof;

a binder comprised of a polymeric material which has a surface free energy which is different from that of the fluorocarbon polymer powder and which is at least one polymer selected from the group consisting of polyvinylidene fluoride, acrylic silicone resin, polyester resin, ethylene/carbon monoxide copolymer, ethylene/ vinylketone copolymer, propylene/vinylketone copolymer, and styrene/vinylketone copolymer; and an additive comprising a substance which is selected from the group consisting of a fluoro oil, a surfactant, and a mixture thereof, which has a surface free energy which is less than that of said binder and which exceeds that of said fluorocarbon polymer powder so that wetability of the fluorocarbon polymer powder with the binder is improved and gap formation there between reduced.

2. The coating composition as claimed in claim 1, wherein the fluoro oil is selected from the group consisting of perfluorinated polyether, perfluorinated alkyl polyether, and polytrifluoroethylene.

3. The coating composition as claimed in claim 1, wherein the surfactant is a fluorocarbon surfactant.

4. The coating composition as claimed in claim 1, wherein the fluorocarbon polymer powder has a particle size ranging from 1 to 100 $\mu$m.

5. A coating composition having prolonged water repellent properties, comprising:

from 80 to 90% by volume of a fluorocarbon polymer powder comprised of a fluorocarbon polymer which has an average molecular weight ranging from 500 to 20,000, which has substantially completely fluorinated terminal groups and is prepared in an atmosphere having an oxygen concentration not higher than 0.1% so that groups in the polymer chain capable of forming hydrogen bonds with molecules of water are minimized, and which is selected from the group consisting of polytetrafluoroethylene, tetrafluoroethylene/ hexafluoropropylene coploymer, polyvinylidene fluoride and mixtures thereof;

a binder comprised of a polymeric material which has a surface free energy which is different from that of the fluorocarbon polymer powder and which is at least one polymer selected from the group consisting of polyvinylidene fluoride, acrylic silicone resin, polyester resin, ethylene/carbon monoxide copolymer, ethylene/ vinylketone copolymer, propylene/vinylketone copolymer, and styrene/vinylketone copolymer; and an additive comprising a substance which is selected from the group consisting of a fluoro oil, a surfactant, and a mixture thereof, which has a surface free energy which is less than that of said binder and which exceeds that of said fluorocarbon polymer powder so that wetability of the fluorocarbon polymer powder with the binder is improved and gap formation there between reduced, wherein the coating composition has an agglomerated form comprised of agglomerates of the fluorocarbon polymer powder, the binder, and the additive, wherein gaps are defined between particles of the agglomerates, and wherein one of the binder or the additive fills the gaps between particles of the agglomerates.

6. A composition which is water repellent, which has a water contact angle of at least 150°, and which has prolonged water repellant properties, consisting essentially of:

from 80 to 90% by volume of a fluorocarbon polymer powder comprised of a fluorocarbon polymer which has an average molecular weight ranging from 500 to 20,000,which has substantially completely fluorinated terminal groups and is prepared in an atmosphere having an oxygen concentration not higher than 0.1% so that groups in the polymer chain capable of forming hydrogen bonds with molecules of water are minimized, and which is selected from the group consisting of polytetrafluoroethylene, tetrafluoroethylene/ hexafluoropropylene coploymer, polyvinylidene fluoride and mixtures thereof;

a matrix resin which is comprised of a polymeric material having a surface free energy which is different from that of the fluorocarbon polymer powder, and which is at least one polymer selected from the group consisting of polyvinylidene fluoride, acrylic silicone resin, polyester resin, ethylene/carbon monoxide copolymer, ethylene/vinylketone copolymer, propylene/ vinylketone copolymer, and styrene/vinylketone copolymer; and an additive comprised of a substance which is selected from the group consisting of a fluoro oil, a surfactant, and a mixture thereof, which has a surface free energy which is less than that of the matrix resin and which exceeds that of said fluorocarbon polymer powder so that wetability of the fluorocarbon polymer powder with the binder is improved and gap formation there between reduced.

7. The composition as claimed in claim 6, wherein the fluoro oil is selected from the group consisting of perfluorinated polyether, perfluorinated alkyl polyether, and polytrifluoroethylene.

8. The composition as claimed in claim 6, wherein the surfactant is a fluorocarbon surfactant.

9. A composition which is water repellent and which has prolonged water repellant properties, comprising:

from 80 to 90% by volume of a fluorocarbon polymer powder comprised of a fluorocarbon polymer which has an average molecular weight ranging from 500 to 20,000, which has substantially completely fluorinated terminal groups and is prepared in an atmosphere having an oxygen concentration not higher than 0.1% so that groups in the polymer chain capable of forming hydrogen bonds with molecules of water are minimized, and which is selected from the group consisting of polytetrafluoroethylene, tetrafluoroethylene/hexafluoropropylene coploymer, polyvinylidene fluoride and mixtures thereof;

a matrix resin which is comprised of a polymeric material having a surface free energy which is different from that of the fluorocarbon polymer powder, and which is at least one polymer selected from the group consisting of polyvinylidene fluoride, acrylic silicone resin, polyester resin, ethylene/carbon monoxide copolymer, ethylene/vinylketone copolymer, propylene/vinylketone copolymer, and styrene/vinylketone copolymer; and an additive comprised of a substance which is selected from the group consisting of a fluoro oil, a surfactant, and a mixture thereof, which has a surface free energy which is less than that of the matrix resin and which exceeds that of said fluorocarbon polymer powder so that wetability of the fluorocarbon polymer powder with the binder is improved and gap formation there between reduced, wherein the composition has an agglomerated form comprised of agglomerates of the fluorocarbon polymer powder, the matrix resin, and the additive, wherein gaps are defined between particles of the agglomerates, and wherein one of the matrix resin or the additive fill the gaps between particles of the agglomerates.

10. A film which is a fluorocarbon polymer coating having a water contact angle of at least 150° and having prolonged water repellant properties, consisting essentially of:

from 80 to 89% by volume of a fluorocarbon polymer powder comprised of a fluorocarbon polymer which has an average molecular weight ranging from 500 to 20,000, which has substantially completely fluorinated terminal groups and is prepared in an atmosphere having an oxygen concentration not higher than 0.1% so that groups in the polymer chain capable of forming hydrogen bonds with molecules of water are minimized, and which is selected from the group consisting of polytetrafluoroethylene, tetrafluoroethylene/hexafluoropropylene coploymer, polyvinylidene fluoride and mixtures thereof;

a binder comprised of a polymeric material which has a surface free energy which is different from that of the fluorocarbon polymer powder and which is at least one polymer selected from the group consisting of polyvinylidene fluoride, acrylic silicone resin, polyester resin, ethylene/carbon monoxide copolymer, ethylene/vinylketone copolymer, propylene/vinylketone copolymer, and styrene/vinylketone copolymer; and an additive comprising a substance which is selected from the group consisting of a fluoro oil, a surfactant, and a mixture thereof, which has a surface free energy which is less than that of the binder and which exceeds that of said fluorocarbon polymer powder so that wetability of the fluorocarbon polymer powder with the binder is improved and gap formation there between reduced.

11. The film as claimed in claim 10, wherein the fluoro oil is selected from the group consisting of perfluorinated polyether, perfluorinated alkyl polyether, and polytrifluoroethylene.

12. The film as claimed in claim 10, wherein the surfactant is a fluorocarbon surfactant.

13. A film which is a fluorocarbon polymer coating having prolonged water repellant properties, comprising:

from 80 to 89% by volume of a fluorocarbon polymer powder comprised of a fluorocarbon polymer which has an average molecular weight ranging from 500 to 20,000, which has substantially completely fluorinated terminal groups and is prepared in an atmosphere having an oxygen concentration not higher than 0.1% so that groups in the polymer chain capable of forming hydrogen bonds with molecules of water are minimized, and which is selected from the group consisting of polytetrafluoroethylene, tetrafluoroethylene/hexafluoropropylene coploymer, polyvinylidene fluoride and mixtures thereof;

a binder comprised of a polymeric material which has a surface free energy which is different from that of the fluorocarbon polymer powder and which is at least one polymer selected from the group consisting of polyvinylidene fluoride, acrylic silicone resin, polyester resin, ethylene/carbon monoxide copolymer, ethylene/vinylketone copolymer, propylene/vinylketone copolymer, and styrene/vinylketone copolymer; and an additive comprising a substance which is selected from the group consisting of a fluoro oil, a surfactant, and a mixture thereof, which has a surface free energy which is less than that of the binder and which exceeds that of said fluorocarbon polymer powder so that wetability of the fluorocarbon polymer powder with the binder is improved and gap formation there between reduced, wherein the film comprises agglomerates comprising the fluorocarbon polymer powder, the binder, and the additive, wherein gaps are defined between particles of the agglomerates, and wherein one of the binder or the additive fills the gaps between particles of the agglomerates.

14. The coating composition as claimed in claim 1, wherein the binder is selected from the group consisting of polyvinylidene fluoride, acrylic silicone resin, and polyester resin.

15. The coating composition as claimed in claim 6, wherein the fluorocarbon polymer powder has a particle size ranging from 1 to 100 $\mu$m.

16. The film as claimed in claim 10, wherein the binder is selected from the group consisting of polyvinylidene fluoride, acrylic silicone resin, and polyester resin.

17. The film as claimed in claim 10, wherein the fluorocarbon polymer powder has a particle size ranging from 1 to 100 $\mu$m.

* * * * *